US007076061B1

(12) United States Patent
Lenstra et al.

(10) Patent No.: US 7,076,061 B1
(45) Date of Patent: Jul. 11, 2006

(54) EFFICIENT AND COMPACT SUBGROUP TRACE REPRESENTATION ("XTR")

(75) Inventors: Arjen K. Lenstra, Mendham, NJ (US); Eric R. Verheul, Eindhoven (NL)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/573,153

(22) Filed: May 19, 2000

Related U.S. Application Data

(63) Continuation-in-part of application No. 09/498,716, filed on Feb. 7, 2000.

(51) Int. Cl.
*H04L 9/00* (2006.01)
*H04K 1/00* (2006.01)

(52) U.S. Cl. .......................................... 380/44; 380/28
(58) Field of Classification Search ................. 380/28, 380/44
See application file for complete search history.

(56) References Cited

U.S. PATENT DOCUMENTS

| | | |
|---|---|---|
| 4,405,829 A | 9/1983 | Rivest et al. |
| 4,587,627 A | 5/1986 | Omura |
| 4,745,568 A | 5/1988 | Onyszchuk et al. |
| 4,870,681 A | 9/1989 | Sedlak |
| 4,995,082 A | 2/1991 | Schnorr |
| 5,231,668 A | 7/1993 | Kravitz |
| 5,351,297 A | 9/1994 | Miyaji et al. |
| 5,406,628 A | 4/1995 | Beller et al. |
| 5,442,707 A | 8/1995 | Miyaji et al. |
| 5,481,613 A | 1/1996 | Ford et al. |
| 5,787,028 A | 7/1998 | Mullin |
| 6,252,960 B1 | 6/2001 | Serroussi |

FOREIGN PATENT DOCUMENTS

WO    WO 85/01625    4/1985

OTHER PUBLICATIONS

Neal Koblitz, "A Course in Number Theory and Cryptography," Springer, pp. 87-89, 99-106, 178-182.
Bruce Schneier, "Applied Cryptography", 2e, John Wiley & Sons, Inc., pp. 496-499.
P. Duhamel et al., "A Decomposition of the Arithmetic for NTT's with 2 as a Root of Unity," ICASSP '84.
R.L. Rivest et al., "A Method for Obtaining Digital Structures and Public-Key Cryptosystems", *Communications of the ACM*, vol. 21, No. 2, pp. 120-126, 1978.
A.K. Lenstra and H. W. Lenstra Jr., "Algorithms in Number Theory", *Handbook of Theoretical Computer Science*, pp. 675-715, 1990.
D. Coppersmith, "Finding a Small Root of a Bivariate Integer Equation; Factoring with High Bits Known", *EUROCRYPT '96, Proceedings*, LNCS 1070, pp. 178-189, 1996.
S. Garfinkel, "PBP: Pretty Good Privacy," 1995, pp. 42-43.
Guillou, Davio and Quisquater, "Public Key Techniques: Randomness and Redundancy", Cryptologia, 1989, pp. 167-182.
S. Gao and H. Lenstra, "Optimal Normal Bases, Codes and Cryptography," 2, pp. 315-323.
Elwyn R. Berlekamp, "Algebraic Coding Theory" revised 1984 edition, Aegean Park Press, Chapter 10.
U.M. Maurer, "Fast Generation of Prime Numbers and Secure Public-Key Cryptographic Parameters", *Journal of Cryptology*, vol. 8, p. 123-155, 1995.
P.L. Montgomery, "Modular Multiplication Without Trial Division", *Mathematics of Computation*, vol. 44, No. 170, pp. 519-521, 1985.
Vanstone et al., "Short RSA Keys and Their Generation", Journal of Cryptology, Spring 1995, vol. 8, No. 2, pp. 101-114.
Young, A. et al., "The dark side of "black-box" cryptography or: Should we trust Capstone", Advances on Cryptology, CRYPTO '96, Aug. 18-22, 1996; pp. 89-103.
Vanstone et al., "Using Four-Prime RSA in which some of the Bits are Specified," Electronics Letters, GV, IEE Stevenage, vol. 30, No. 25, Aug. 12, 1994, pp. 2118-2119.
Coppersmith and Andrew Odlyzko, "Discrete Logarithms in GF(p)", Algorithmica, vol. 1, No. 1, 1986; pp. 1-15.
Guillou and Quisquater, "Precautions Taken against Various Potential Attacks", Europcrypt '90, Springer 1990, pp. 465-473.
"Information Technology—Open System Interconnection—The Directory: Authentication Framework", ITU-T Recommendation X-509, ISO/IEC 9594-8: 1995(E), pp. 1-35. 1995.
Agnew, G.B. et al., "An Implementation for a Fast Public-Key Cryptosystem", Journal of Cryptology, 1991, vol. 3, pp. 63-79.
Robert D. Silverman, "Fast Generation of Random, Strong RSA Primes", *RSA Laboratories' CryptoBytes*, vol. 3, No. 1, pp. 9-13 Spring 1997.
Ohta et al., (Eds), "Advances in Cryptology", CRYPTO '98, pp. 1-10.
Arjen K. Lenstra, "Generating RSA Moduli with a Predetermined Portion," Advances in Cryptology, ASIACRYPT '98, Beijing, China, Oct. 18-22, 1998; pp. 1-10.
R.C. Mullin et al., Optimal Normal Bases in $GF(p^n)^*$., *Discrete Applied Mathematics*, 22 (1988/89), pp. 149-161.

(Continued)

*Primary Examiner*—Kambiz Zand
*Assistant Examiner*—Benjamin E. Lanier
(74) *Attorney, Agent, or Firm*—Morgan & Finnegan, LLP

(57) ABSTRACT

Improvements are obtained in key generation and cryptographic applications in public key cryptography, by reducing the bit-length of public keys, thereby reducing the bandwidth requirements of telecommunications devices, such as wireless telephone sets.

32 Claims, 11 Drawing Sheets

OTHER PUBLICATIONS

Lenstra et al. "Fast Irreducibility and Subgroup Membership Testing in XTR", Public Key Cryptography, Kim (ed) Springer-Verlag, 2001.

Lentra et al. "The XTR Public Key System", (extended version of Crypto 2000 Presentation), pp. 73-86.

"Chapter 12. A New Public-Key Cryptosystem":pp. 1-11.

"The XTR Cryptosystem", Internet, Sept. 2001, pp. 1-5.

More "Letter to DDJ", Doctor Dobb's Journal on CD-Rom, May 1993, pp. 2-3.

Smith "Cryptography Without Exponentiation", Dr. Dobb's Journal on CD-Rom, Apr. 1994, pp. 1-3.

Smith "LUC Public-Key Encryption", Dr. Dobb's Journal on CD-Rom, Jan. 1993, pp. 1-12.

Mc Eliece "Finiate Fields for Computer Scientists and Engineers", Kluwer Academic Publishers, 1987, pp. 96-119.

Gong et al. "Public-Key Cryptosystems Based on Cubic Finite Field Extensions", IEEE Transactions on Information Theory, vol. 45, No. 7, Nov. 1999, pp. 2601-2605.

Menezes et al. "Handbook of Applied Cryptography", CRC Press, 1997.

Lenstra et al. "Key Improvements to XTR", Asiacrypt, 2000.

Brouwer et al.; "Doing More with Fewer Bits"; Advances in Cryptology—Asiacrypt' 99, 1999, pp. 321-332.

Elgamal, "A Public Key Cryptosystem and a Signature Scheme Based on Discrete Logarithms", IEEE Transations on Information Theory, vol. 31, No. 4, pp. 469-472, Jul. 1985.

Lidl et al., "Introduction to Finite Fields and Applications", pp. 50-55, 1986.

"Choosing Good Elliptic Curves", Author Unknown, Date Unknown.

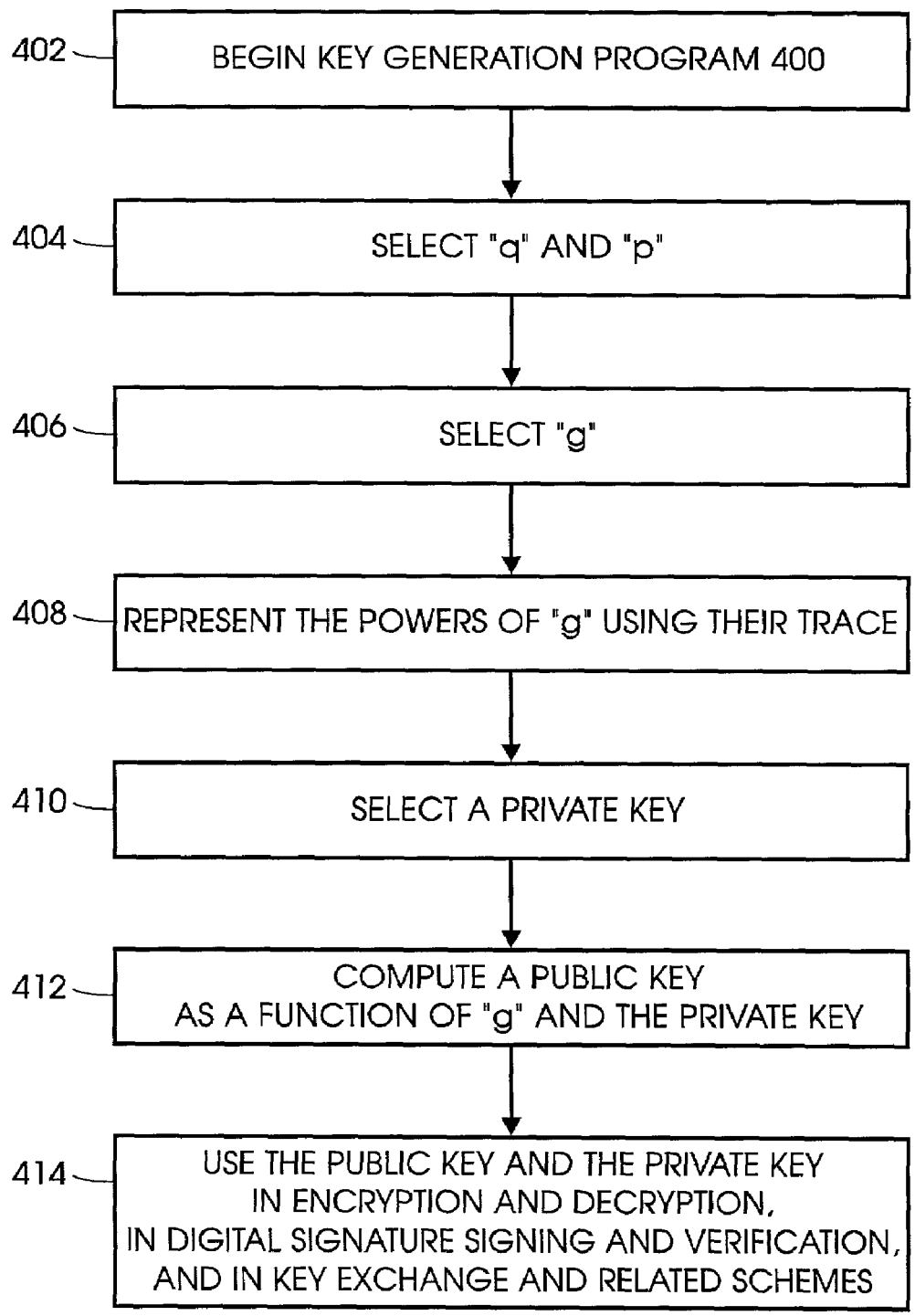

Let $p \equiv 2 \mod 3$ be a prime number such that $6*\log_2(p) \approx 1024$ and such that $\phi_6(p) = p^2 - p + 1$ has a prime factor $q$ with $\log_2(q) \geq 160$. Such $p$ and $q$ (or of any other reasonable desired size) can quickly be found by picking $r$ such that $r^2 - r + 1$ is prime, by finding an integer $k$ such that $r + k*(r^2 - r + 1)$ is prime and 2 mod 3, and by setting $q = r^2 - r + 1$ and $p = r + k*(r^2 - r + 1)$ for the resulting $k$. Note that the resulting $p$ satisfies a degree two polynomial with small coefficients, and thus allows fast modular arithmetic. In particular if one restricts the search to $k = 1$, the resulting $p$'s will be of the form $r^2 + 1$ (note that in this case $r$ must be even, and that $p$ is 1 mod 4). On the other hand, such 'nice' $p$ may be undesirable from a security point of view because they may make application of the Discrete Logarithm variant of the Number Field Sieve easier. Another method to generate $p$ and $q$ that does not have this disadvantage (and thus neither the advantage of fast arithmetic modulo $p$) works as follows: pick a prime $q \equiv 7 \mod 12$, find the two roots $r_1$ and $r_2$ of $x^2 - x + 1 \equiv 0 \mod q$, and find an integer $k$ such that $p = r_i + k*q$ is 2 mod 3 and prime for $i = 1$ or 2. If desired, primes $q$ can be selected until the smallest or the largest root is prime, or any other straightforward variant that fits one's needs may be used, for instance to get $\log_2(q) \approx 180$ and $6*\log_2(p) \approx 3000$, i.e., $\log_2(p)$ considerably bigger than $\log_2(q)$. From $q \equiv 7 \mod 12$ it follows that $q \equiv 1 \mod 3$ so that, with quadratic reciprocity, $x^2 - x + 1 \equiv 0 \mod q$ has two roots. It also follows that $q \equiv 3 \mod 4$ which implies that those roots can be found using a single $((q+1)/4)^{th}$ powering modulo $q$.

By $g \in GF(p^6)$ we denote an element of order $q$. It is well known that $g$ is not contained in any proper subfield of $GF(p^6)$ (cf. [13]). In the next section it is shown that there is no need for an actual representation of $g$ and that arithmetic on elements of $GF(p^6)$ can be entirely avoided. Thus, there is no need to represent elements of $GF(p^6)$, for instance by constructing an irreducible $3^{rd}$ degree polynomial over $GF(p^2)$. A representation of $GF(p^2)$ is needed however. This is done as follows.

From $p \equiv 2 \mod 3$ it follows that $p \mod 3$ generates $GF(3)^*$, so that the zeros $\alpha$ and $\alpha^p$ of the polynomial $(X^3 - 1)/(X - 1) = X^2 + X + 1$ form an optimal normal basis for $GF(p^2)$ over $GF(p)$. Because $\alpha^i = \alpha^{i \mod 3}$, an element $x \in GF(p^2)$ can be represented as $x_0\alpha + x_1\alpha^p = x_0\alpha + x_1\alpha^2$ for $x_0, x_1 \in GF(p)$, so that $x^p = x_0^p\alpha^p + x_1^p\alpha^{2p} = x_1\alpha + x_0\alpha^2$. In this representation of $GF(p^2)$ an element $t$ of $GF(p)$ is represented as $-t\alpha - t\alpha^2$, e.g. 3 is represented as $-3\alpha - 3\alpha^2$.

Fig. 5 is a flow diagram of the method for the selection of "p", as shown in section 2.1.

Algorithm 2.4.4, computation of $S(n)$ given $B = T(1)$ If $n < 0$, apply this algorithm to $-n$ and use Lemma 2.3.4. If $n = 0$, then $S(0) = (B^p, 3, B)$; if $n = 1$, then $S(1) = (3, B, B^2 - 2B^p)$ (cf. Corollary 2.4.2.i); if $n = 2$, use Corollary 2.4.2.ii and $S(1)$ to compute $T(3)$ and thereby $S(2)$. Otherwise, to compute $T(n)$ for $n > 2$ let $k = 3$, $m = n$, and compute $S(k)$ using Corollary 2.4.2.ii and $S(2)$. If $m$ is even, then replace $m$ by $m-1$ and next let $m = \Sigma_{0 \leq i \leq r} m_i 2^i$ with $m_i \in \{0,1\}$ and $m_r = 1$. For $i = r-1, r-2, \ldots, 1$ in succession do the following:

If $m_i = 0$, then replace $S(k) = (T(k-1), T(k), T(k+1))$ by $S(2k-1) = (T(2k-2), T(2k-1), T(2k))$ and $k$ by $2k-1$, using Corollary 2.4.2.i for $T(2k-2)$ and $T(2k)$ and Corollary 2.4.2.iii for $T(2k-1)$.

If $m_i = 1$, then replace $S(k) = (T(k-1), T(k), T(k+1))$ by $S(2k+1) = (T(2k), T(2k+1), T(2k+2))$ and $k$ by $2k+1$, using Corollary 2.4.2.i for $T(2k)$ and $T(2k+2)$ and Corollary 2.4.2.iv for $T(2k+1)$.

Finally, if $n$ is even replace $S(k) = (T(k-1), T(k), T(k+1))$ by $S(k+1) = (T(k), T(k+1), T(k+2))$ and $k$ by $k+1$ using Corollary 2.4.2.i. As a result we have that $k = n$ so that $S(n) = S(k)$.

Fig. 6 is a flow diagram of the arithmetic method to support key generation, as shown in Algorithm 2.4.4.

Algorithm 3.3.8, computation of $B$

1. Pick at random an element $B' \in \text{GF}(p^2)^*\backslash\text{GF}(p)^*$;

2. Use Algorithm 2.4.4 with $B$ replaced by $B'$ and $T$ replaced by $V$ to compute $V(p+1)$;

3. If $V(p+1) \in \text{GF}(p)$, then return to Step 1;

4. Use Algorithm 2.4.4 with $B$ replaced by $B'$ to compute $T((p^2-p+1)/q)$;

5. If $T((p^2-p+1)/q) = 3$, then return to Step 1;

6. Let $B = T((p^2-p+1)/q)$.

Fig. 7 is a flow diagram of the method of key generation, as shown in Algorithm 3.3.8.

| 4.1 Application to the Diffie-Hellman Scheme |
|---|
| Suppose that two parties, Alice and Bob, who both have access to the public key data $p$, $q$, $B$ want to agree on a shared secret key. They can do this by performing the following XTR version of the Diffie-Hellman scheme:<br>1. Alice selects at random an integer $a$, $1 < a < q - 2$, uses Algorithm 2.4.4 to compute $V_A = T(a) \in GF(p^2)$, and sends $V_A$ to Bob.<br>2. Bob receives $V_A$ from Alice, selects at random an integer $b$, $1 < b < q - 2$, uses Algorithm 2.4.4 to compute $V_B = T(b) \in GF(p^2)$, and sends $V_B$ to Alice.<br>3. Alice receives $V_B$ from Bob, and uses Algorithm 2.4.4 with $B$ replaced by $V_B$ to compute $K_{AB} = T(a) \in GF(p^2)$.<br>4. Bob uses Algorithm 2.4.4 with $B$ replaced by $V_A$ to compute $K_{AB} = T(b) \in GF(p^2)$.<br>The length of the messages exchanged in this DH variant is about one third of the length of the messages in other implementations of the DH scheme that achieve the same level of security and that are based on the difficulty of computing discrete logarithms in (a subgroup of) the multiplicative group of a finite field. Also, the XTR version of the DH scheme requires considerably less computation than those previously published methods (cf. Remark 2.4.6). |

Fig. 8 is a flow diagram of the method of Diffie-Hellman key exchange, as shown in section 4.1, using keys generated by the method of Fig. 7.

| | |
|---|---|
| 4.2 | Application to the ElGamal Encryption Scheme |

Suppose that Alice is the owner of the public key data $p$, $q$, $B$, and that Alice has selected a secret integer $k$ and computed the corresponding public value $C = T(k)$ using Algorithm 2.4.4. Thus, Alice's public key data consists of $(p, q, B, C)$. Given Alice's public key $(p, q, B, C)$ Bob can encrypt a message $M$ intended for Alice using the following XTR version of ElGamal encryption:

| | |
|---|---|
| 1. | Bob selects at random an integer $b$, $1 < b < q - 2$; |
| 2. | Bob uses Algorithm 2.4.4 to compute $V_B = T(b) \in GF(p^2)$. |
| 3. | Bob uses Algorithm 2.4.4 with $B$ replaced by $C$ to compute $K = T(b) \in GF(p^2)$. |
| 4. | Bob uses $K$ to encrypt $M$, resulting in the encryption $E$. |
| 5. | Bob sends $(V_B, E)$ to Alice. |

Note that Bob may have to hash the bits representing $K$ down to a suitable encryption key length.

Upon receipt of $(V_B, E)$, Alice decrypts the message in the following manner:

| | |
|---|---|
| 1. | Alice uses Algorithm 2.4.4 with $B$ replaced by $V_B$ to compute $K = T(k) \in GF(p^2)$. |
| 2. | Alice uses $K$ to decrypt $E$ resulting in $M$. |

The message $(V_B, E)$ sent by Bob consists of the actual encryption $E$, whose length strongly depends on the length of $M$, and the overhead $V_B$, whose length is independent of the length of $M$. The length of the overhead in this variant of the ElGamal encryption scheme is about one third of the length of the overhead in other implementations of hybrid ElGamal encryption (cf. Remark 4.2.1). Also, the XTR version of ElGamal encryption and decryption is considerably faster (cf. Remark 2.4.6).

Fig. 9 is a flow diagram of the method of ElGamal encryption, as shown in section 4.2, using keys generated by the method of Fig. 7.

Algorithm 2.5.3, computation of the representation of $g^a * y^b$ for integers $a, b$ with $1 < a, b < q$, given the representation $B$ of $g$ and the representations $C$, $C_+$, and $C_-$ of $y$, $y*g$, and $y/g$, respectively 1. Compute $c = a/b \bmod q$.
2. Given $B$ use Algorithm 2.4.4 to compute $S(c) = (T(c-1), T(c), T(c+1))$.
3. Use Lemma 2.5.2 with $T(0) = 3$, $T(1) = B$, $T(-1) = B^p$, $T(c)$, $T(c+1)$, and $T(c-1)$ to compute $A^c$.
4. Use Lemma 2.5.1 with $A^c$ applied to the vector $(C_+, C, C_-)^T$ to compute $T(c + k)$; notice that $k$ is unknown.
5. Use Algorithm 2.4.4 with $B$ replaced by $T(c + k)$ and $n$ replaced by $b$ to compute the representation $T((c + k) * b) = T(a + k * b)$ of $g^a * y^b$.

Fig. 10A is a flow diagram of the arithmetic method to support generating digital signatures, as shown in Algorithm 2.5.3.

| 4.3 | Application to Digital Signature Schemes |
|---|---|

Let, as in 4.2, Alice's public key data consists of $(p, q, B, C)$, where $C = T(k)$ and $k$ is Alice's private key. Furthermore, assume that $C_+ = T(k+1)$ or $C_- = T(k-1)$ is included in Alice's public key (cf. 2.5). If $C_+$ is included in Alice's public key, we assume that the methods from Section 4.5 are used to derive $C_-$, and vice versa, so that both $C_+$ and $C_-$ are available to the verifying party Bob. We show how the Nyberg-Rueppel (NR) message recovery signature scheme can be implemented using XTR. Application of XTR to other digital signature schemes goes in a similar way. To sign a message $M$ containing an agreed upon type of redundancy, Alice does the following:

1. Alice selects at random an integer $a$, $1 < a < q - 2$.
2. Alice uses Algorithm 2.4.4 to compute $V_A = T(a) \in GF(p^2)$.
3. Alice uses $V_A$ to encrypt $M$, resulting in the encryption $E$.
4. Alice computes the (integer valued) hash $h$ of $E$.
5. Alice computes $s = (k * h + a)$ modulo $q$ in the range $\{0,1, ..., q-1\}$.
6. Alice's resulting signature on $M$ is $(E,s)$.

As in 4.2 Alice may have to hash the bits representing $V_A$ down to a suitable encryption key length.

To verify Alice's signature $(E,s)$ and to recover the signed message $M$, Bob does the following:

1. Bob obtains Alice public key data $(p, q, B, C, C_+, C_-)$.
2. Bob checks that $0 \leq s < q$; if not failure.
3. Bob computes the hash $h$ of $E$ (using the same hash function used by Alice).
4. Bob replaces $h$ by $-h$ modulo $q$ (i.e., in the range $\{0,1, ..., q-1\}$).
5. Bob uses Algorithm 2.5.3 to compute the representation $V_B$ of $g^s * y^h$ given $a = s$, $b = h$, $B$, $C$, $C_+$, and $C_-$.
6. Bob uses $V_B$ to decrypt $E$ resulting in the message $M$.
7. If $M$ contains the agreed upon type of redundancy, then the signature is accepted; if not the signature is rejected.

Both for signature generation and signature verification XTR is considerably faster than other subgroup based implementations of the NR scheme (cf. Remarks 2.4.6 and 2.5.5). The length of the signature is identical to other variants of the hybrid version of the NR scheme (cf. Remark 4.2.1): an overhead part of length depending on the desired security (i.e, the subgroup size) and a message part of length depending on the message itself and the agreed upon redundancy. Similar statements hold for other digital signature schemes, such as DSA.

Fig. 10B is a flow diagram of the method of generating digital signatures, as shown in section 4.3, using keys generated by the method of Fig. 7.

US 7,076,061 B1

EFFICIENT AND COMPACT SUBGROUP TRACE REPRESENTATION ("XTR")

RELATED PATENT APPLICATIONS

This is a continuation-in-part of application Ser. No. 09/498,716, filed Feb. 7, 2000, entitled "Efficient And Compact Subgroup Trace Representation ("XTR")". The following copending U.S. patent applications are directed to related inventions and are incorporated herein by reference: U.S. patent application Ser. No. 08/800,669, filed Feb. 14, 1997, by Arjen K. Lenstra, entitled "Cyclotomic Polynomial Construction Of Discrete Logarithm Cryptosystems Over Finite Fields"; U.S. patent application Ser. No. 09/057,176, filed Apr. 8, 1998, by Arjen K. Lenstra, entitled "Generating RSA Moduli Including A Predetermined Portion".

BACKGROUND OF THE INVENTION

1. Field of the Invention

The invention disclosed broadly relates to public key cryptography and more particularly relates to improvements in key generation and cryptographic applications in public key cryptography.

2. Related Art

The generation of a modulus as part of a public key according to the Rivest-Shamir-Adleman (RSA) cryptographic method is described in U.S. Pat. No. 4,405,829 (Rivest et al.), "Cryptographic Communications System and Method", the disclosure of which is hereby incorporated by reference. In a set-up phase of the RSA scheme, a participant picks two prime numbers, p and q, each having a selected number of bits, such as 512 bits, with p not equal to q. The participant keeps p and q secret. The participant computes an RSA modulus n, with n=p*q. When p and q each have 512 bits, n has 1023 or 1024 bits. The participant picks an RSA exponent e that has no factors in common with (p−1)(q−1). For efficiency purposes, the RSA exponent e is often chosen of much shorter length than the RSA modulus. When the RSA modulus n has 1024 bits, the RSA exponent e typically has at most 64 bits. The owning participant makes the public key (n, e) available to other participants.

During operational use of the RSA scheme, other participants use the public key (n, e) to encrypt messages for the participant which owns that key. The owning participant is able to decrypt messages encrypted with the public key (n, e) due to possession of the secret prime numbers p and q.

Participants must store not only the public key of other participants, but also identifying information such as the name, address, account number and so on of the participant owning each stored public key. There are problems with this situation.

One problem with the present technique for using the RSA encryption scheme is that, although the RSA modulus n is 1024 bits, the amount of security provided actually corresponds to only 512 bits, since an attacker who knows one of p and q can readily obtain the other of p and q. Instead of having to store 1024 bits to obtain 512 truly secure bits, it is desirable to store far fewer bits, such as approximately 512 bits, to obtain the 512 truly secure bits.

Another problem with the present technique is that the long bit-length of the public keys imposes a significant bandwidth load on telecommunications devices, such as wireless telephone sets. It is desirable to reduce the amount of bandwidth load as much as possible.

Generating RSA moduli having a predetermined portion has been considered by Scott A. Vanstone and Robert J. Zuccherato in "Short RSA Keys and Their Generation", J. Cryptology, 1995, volume 8, pages 101–114, the disclosure of which is hereby incorporated by reference.

In "Finding a Small Root of a Bivariate Integer Equation; Factoring with High Bits Known", U. Maurer ed., EUROCRYPT '96 Proceedings, pages 178–189, Springer Verlag 1996, the disclosure of which is hereby incorporated by reference, Don Coppersmith has analyzed the security of the Vanstone methods, and found that all but one of Vanstone's methods provide inadequate security. Specifically, for the Vanstone methods having predetermined high order bits, the RSA modulus n is generated in such a way that somewhat more than the high order $((1/4)\log_2 n)$ bits of p are revealed to the public, which enables discovery of the factorization of the RSA modulus n, thus leaving the scheme vulnerable to attack.

SUMMARY OF THE INVENTION

The invention disclosed provides improvements in key generation and cryptographic applications in public key cryptography, by both reducing: 1) the bit-length of public keys and other messages, thereby reducing the bandwidth requirements of telecommunications devices, such as wireless telephone sets, and 2) the computational effort required to generate keys, to encrypt/decrypt and to generate/verify digital signatures.

The method of the invention determines a public key having a reduced length and a factor p, using $GF(p)$ or $GF(p^2)$ arithmetic to achieve $GF(p^6)$ security, without explicitly constructing $GF(p^6)$. The method includes the step of selecting a number p and a prime number q that is a divisor of $p^2-p+1$. Then the method selects an element g of order q in $GF(p^6)$, where g and its conjugates can be represented by B, where $F_g(X)=X-BX^2+B^pX-1$ and the roots of $F_g(X)$ are $g, g^{p-1}$, and $g^{-p}$. Then the method represents the powers of g using their trace over the field $GF(p^2)$. The method then selects a private key. The method then computes a public key as a function of g and the private key. The public key can be used to encrypt a message and the public and private key can be used to decrypt the message. The public and private key can be used for signing a message and the public key can be used for verifying the signature. A Diffie-Hellman key exchange or other related scheme can be conducted using the public key generated by the method. The resulting invention reduces the bit-length of public keys and other messages, thereby reducing the bandwidth requirements of telecommunications devices, and reduces the computational effort required to encrypt/decrypt and to generate/verify digital signatures.

BRIEF DESCRIPTION OF THE DRAWINGS

FIG. 4 is a flow diagram of the method performed in a server and/or a client in the network of FIG. 1, in accordance with the invention;

FIG. 5 is a flow diagram of the preferred embodiment of the method for selection of "p", and "q", as shown in section 2.1;

FIG. 6 is a flow diagram of the arithmetic method to support key generation, as shown in section 2.4.4;

FIG. 7 is a flow diagram of the method of key generation, as shown in section 3.3.8;

FIG. 8 is a flow diagram of the method of Diffie-Hellman key exchange, as shown in section 4.1, using keys generated by the method of FIG. 7;

FIG. 9 is a flow diagram of the method of ElGamal encryption, as shown in section 4.2, using keys generated by the method of FIG. 7;

FIG. 10A is a flow diagram of the arithmetic method to support generating digital signatures, as shown in section 2.5.3; and FIG. 10B is a flow diagram of the method of generating digital signatures, as shown in section 4.3., using keys generated by the method of FIG. 7.

DESCRIPTION OF THE PREFERRED EMBODIMENTS

The Network and System Environment of the Invention

The invention is a method, system, computer program, computer program article of manufacture, and business method for providing improvements in key generation and cryptographic applications in public key cryptography, by both reducing: 1) the bit-length of public keys and other messages, thereby reducing the bandwidth requirements of telecommunications devices, such as wireless telephone sets, and 2) the computational effort required to generate keys, to encrypt/decrypt and to generate/verify digital signatures.

Figure 1:
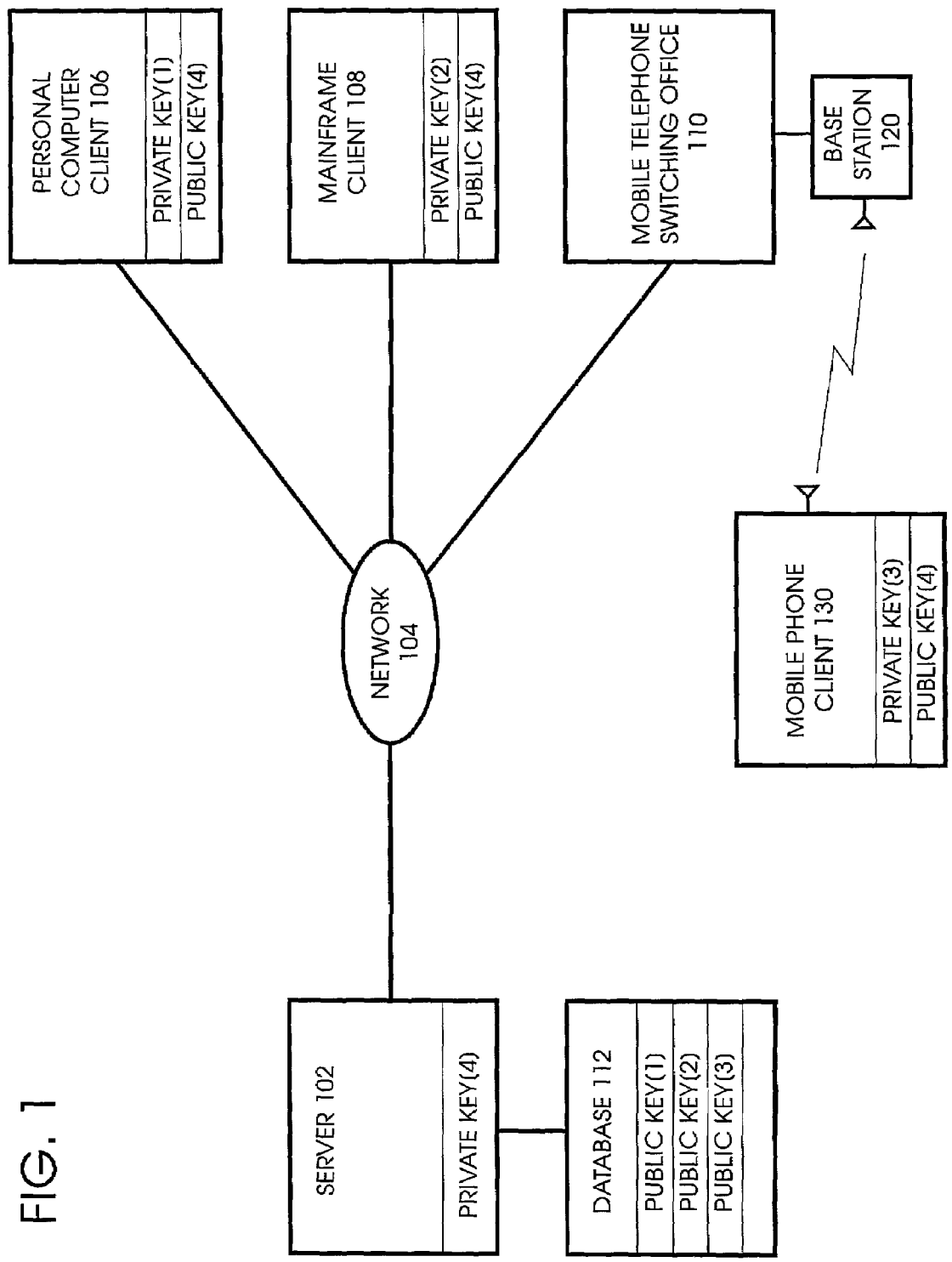
FIG. 1 is a diagram of an example network in which the invention can be carried out.

FIG. 1 is a diagram of an example network in which the invention can be carried out. The method of the invention can be performed, for example, in a server computer connected over a network to a client computer. The method can also be performed, for example, in a client computer. FIG. 1 shows a server computer 102 connected over the Internet network 104 to three client computers, the personal computer 106, the main frame computer 108, and a microprocessor in the mobile phone client 130. The mobile phone client 130 is connected via the mobile telephone switching office 110 and the radio frequency base station 120 to the network 104. A database 112 is connected to the server 102, which stores public keys labeled (1), (2), and (3). Public key (1) was generated, in accordance with the method of the invention, in the personal computer client 106, and was transmitted over the network 104 to the server 102, for storage in the database 112. Public key (2) was generated, in accordance with the method of the invention, in the main frame client 106, and was transmitted over the network 104 to the server 102, for storage in the database 112. Public key (3) was generated, in accordance with the method of the invention, in the microprocessor of the mobile phone client 130, and was transmitted to the base station 120 over its radio frequency link, and via the mobile telephone switching office 110 and the network 104 to the server 102, for storage in the database 112. Public key (4) was generated, in accordance with the method of the invention, in the server computer 102, and was transmitted over the network 104 to each of the clients 106, 108, and 130. Each client 106, 108, and 130 generated, in accordance with the method of the invention, a private key respectively labeled (1), (2), and (3) which remains stored in the respective client. The server 102 generated, in accordance with the method of the invention, a private key labeled (4) which remains stored in the server. All public keys are properly certified using standard key certification methods as can be found in the cryptographic literature, such as the Handbook of Applied Cryptography, by A. J. Menezes, P. C. van Oorschot, and S. A. Vanstone, CRC Press, 1997.

Figure 2:
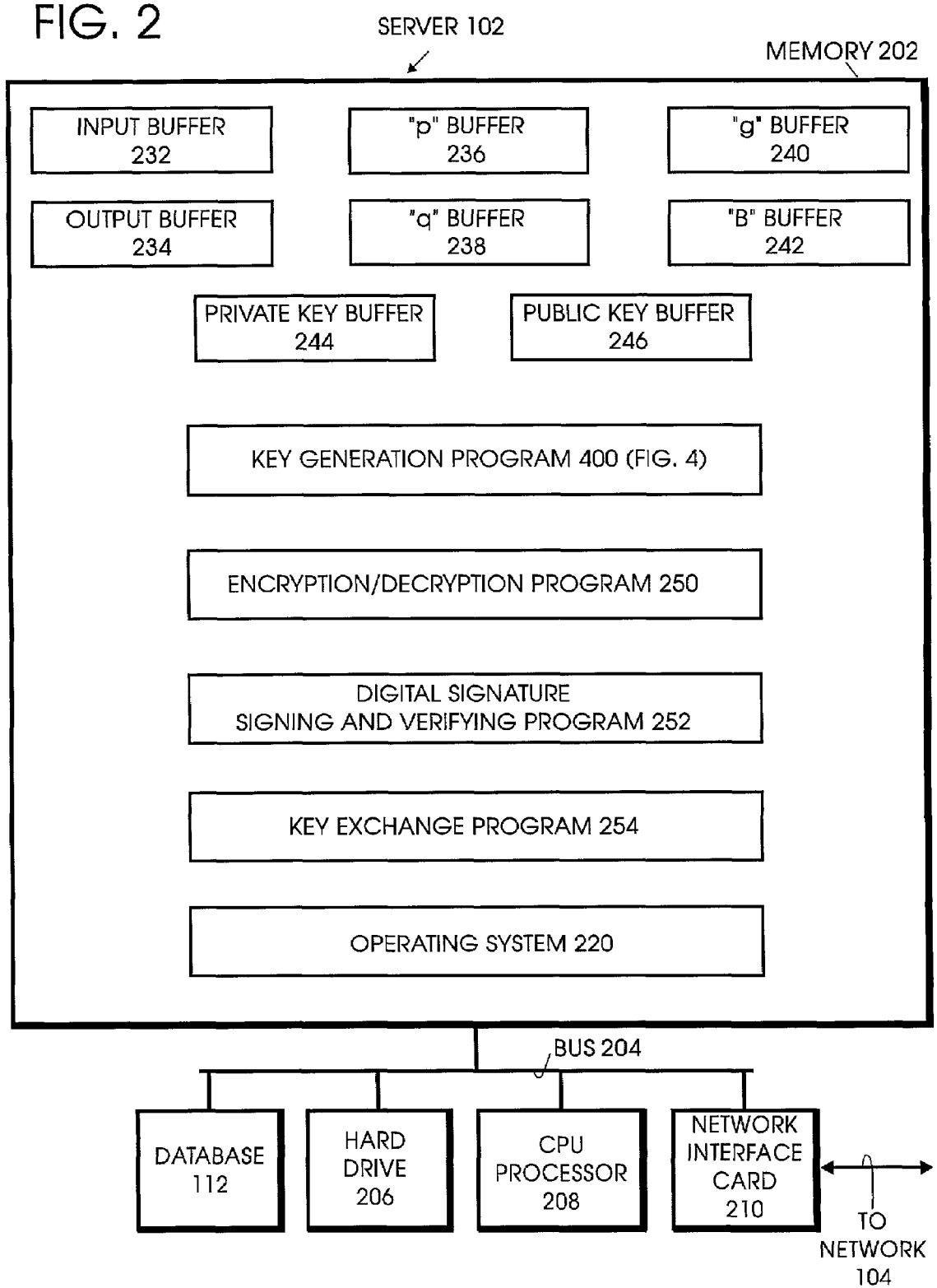
FIG. 2 is a functional block diagram of an example server computer in the network of FIG. 1, in which the invention can be carried out.

FIG. 2 is a functional block diagram of an example server computer in the network of FIG. 1, in which the invention can be carried out. The server computer 102 includes a memory 202 connected by the bus 204 to the database 112, a hard drive 206, a CPU processor 208, and a network interface card 210 which is connected to the Internet network 104. The memory 202 includes an input buffer 232 and an output buffer 234. The memory 202 also includes a "p" buffer 236, a "q" buffer 238, a "g" buffer 240, and a "B" buffer 242. See sections 1, 2, and 3, below, for a discussion of the values "p", "q", "g", and "B". The memory 202 also includes a private key buffer 244, and a public key buffer 246. The memory 202 also includes a key generation program 400, whose flow diagram is shown in FIG. 4, which operates in accordance with the method of the invention. The memory 202 also includes an encryption program 250 that uses the keys generated by the key generation program 400. The method of ElGamal encryption is described in section 4.2 and the method of Cramer-Shoup is described in Section 4.7. The memory 202 also includes a digital signature signing and verifying program 252 that uses the keys generated by the key generation program 400. The arithmetic method to support generating digital signatures is described in section 2.5.3 and the method of generating digital signatures and related protocols such as Cramer-Shoup encryption is described in section 4.3. The memory 202 also includes a key exchange program 254 that uses the keys generated by the key generation program 400. The method of Diffie-Hellman key exchange is described in section 4.1. The memory 202 also includes an operating system program 220. The programs stored in the memory 202 are sequences of executable steps which, when executed by the CPU processor 208, perform the methods of the invention.

Figure 3:
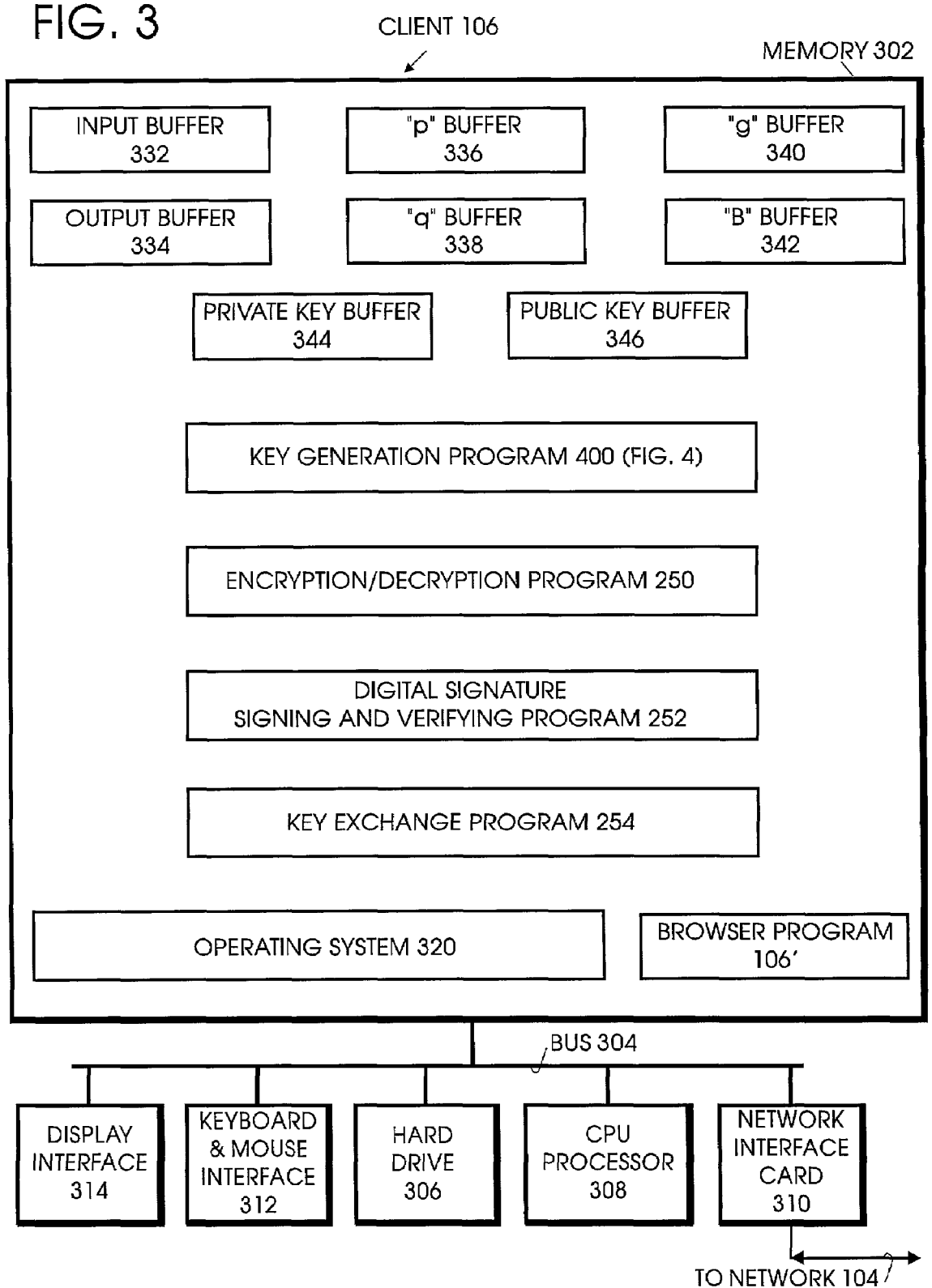
FIG. 3 is a functional block diagram of an example client computer in the network of FIG. 1, in which the invention can be carried out.

FIG. 3 is a functional block diagram of an example client computer in the network of FIG. 1, such as the client 106. The client computer 106 includes a memory 302 connected by the bus 304 to the display interface 314, the keyboard and mouse interface 312, a hard drive 306, a CPU processor 308, and a network interface card 310 which is connected to the Internet network 104. The memory 302 includes an input buffer 332, an output buffer 334, a "p" buffer 336, a "q" buffer 338, a "g" buffer 340, a "B" buffer 342, a private key buffer 344, and a public key buffer 346. The memory 302 also includes the key generation program 400, whose flow diagram is shown in FIG. 4, which operates in accordance with the method of the invention. The memory 302 also includes the encryption program 250 that uses the keys generated by the key generation program 400. The memory 302 also includes a digital signature signing and verifying program 252 that uses the keys generated by the key generation program 400. The memory 302 also includes a key exchange program 254 that uses the keys generated by the key generation program 400. The memory 302 also includes an operating system program 320 and a browser program 106'. The programs stored in the memory 302 are sequences of executable steps which, when executed by the CPU processor 308, perform the methods of the invention.

FIG. 4 is a flow diagram of the method performed in either the server computer 102 of FIG. 2, or in the clients 106, 108, and/or 130 in accordance with the invention. Program 400 is a sequence of executable steps that embody the method of FIG. 4. The method begins at 402 with the step 404 of selecting "q" and "p". The method continues with the step 406 of selecting "g". Then the method continues with the step 408 of representing the powers of "g" using their trace. Then the method continues with the step 410 of selecting a private key. Then the method continues with the step 412 of computing a public key as a function of "g" and the private key. See sections 1, 2, and 3, below, for a discussion of the values "p", "q", and "g". Finally, the method concludes with the step 414 of using the public key and the private key in encryption and decryption, in digital signature signing and verification, and in key exchange and related applications. See section 4, below, for a discussion of these applications.

1. Introduction

The well known Diffie-Hellman (DH) key agreement protocol was the first published practical solution to the key distribution problem, allowing two parties that have never met to establish a shared secret key by exchanging information over an open channel. In the basic DH scheme the two parties agree upon a generator g of the multiplicative group $GF(p)^*$ of a prime field $GF(p)$ and they each send a random power of g to the other party (cf. Section 4 for a full description). Thus, assuming both parties know p and g, each party transmits about $\log_2(p)$ bits to the other party.

In [9] it was suggested that finite extension fields can be used instead of prime fields, but no direct computational or communication advantages were implied. In [20] a variant of the basic DH scheme was introduced where g generates a relatively small subgroup of $GF(p)^*$ of prime order q. This considerably reduces the computational cost of the DH scheme, but has no effect on the number of bits to be exchanged. In [3] it was shown for the first time how the use of finite extension fields and subgroups can be combined in such a way that the number of bits to be exchanged is reduced by a factor 3. More specifically, it was shown that elements of an order q subgroup of $GF(p^6)^*$ can be represented using $2*\log_2(p)$ bits if q divides $p^2-p+1$. Despite its communication efficiency, the method of [3] is rather cumbersome and computationally not particularly efficient.

In this paper we present a greatly improved version of the method from [3] that achieves the same communication advantage at a much lower computational cost. We refer to our new method as XTR, for Efficient and Compact Subgroup Trace Representation. XTR can be used in conjunction with any cryptographic protocol that is based on the use of subgroups and leads to substantial savings in communication or computational overhead, or both, compared to more traditional subgroup representation methods. Furthermore, XTR key generation is very simple. We prove that using XTR in cryptographic protocols does not affect their security. The best attacks we are aware of are Pollard's rho method in the order q subgroup, or the Discrete Logarithm variant of the Number Field Sieve in the full multiplicative group $GF(p^6)^*$. With primes p and q of about $1024/6 \approx 170$ bits the security of XTR is equivalent to traditional subgroup systems using 170-bit subgroups and 1024-bit finite fields. But with XTR subgroup elements can be represented using only about 2*170 bits, which is substantially less than the 1024-bits required for their traditional representation.

The amount of computation required by a full exponentiation using XTR is less than the time required by a full scalar multiplication in an Elliptic Curve cryptosystem (ECC) over a 170-bit prime field, and thus substantially less than the time required by a full exponentiation in either RSA or traditional subgroup discrete logarithm systems of equivalent security. As a result XTR may be regarded as a compromise between RSA and ECC, and it is an excellent alternative to either RSA or ECC in protocols such as SSL (Secure Sockets Layer). XTR achieves security similar to RSA for much smaller public key sizes than RSA (though somewhat larger than ECC public keys), but it is not affected by the uncertainty still marring ECC security. Key selection for XTR is very fast compared to RSA, and orders of magnitude easier and faster than key generation for ECC.

In [15] it is argued that ECC is the only public key system that is suitable for a variety of environments, including low-end smart cards and over-burdened web servers communicating with powerful PC clients. XTR shares this advantage with ECC, with the distinct additional advantage that key selection is very easy. This makes it easily feasible for all users of XTR to have public keys that are not shared with others, unlike ECC where a large part of the public key is often shared between all users of the system. Also, compared to ECC, the mathematics underlying XTR is straightforward, thus avoiding two common ECC-pitfalls: ascertaining that unfortunate parameter choices are avoided that happen to render the system less secure, and keeping abreast of, and incorporating additional checks published in, newly obtained results. The latest example of the latter is [10], where yet another condition affecting the security of ECC over finite fields of characteristic two is described.

Apart from its performance advantages, the most intriguing and innovative aspect of XTR is that it is the first method we are aware of that uses $GF(p^2)$ arithmetic to achieve $GF(p^6)$ security, without explicitly constructing $GF(p^6)$. Denote by g an element of order $q>3$ dividing $p^2-p+1$. Because $p^2-p+1$ divides the order $p^6-1$ of $GF(p^6)^*$ this g can be thought of as a generator of an order q subgroup of $GF(p^6)^*$. As shown in [13], since $p^2-p+1$ does not divide any $p^s-1$ for any integer s smaller than and dividing 6, the subgroup generated by g cannot be embedded in the multiplicative group of any true subfield of $GF(p^6)$ (assuming q is sufficiently large). We show, however, that arbitrary powers of g can be represented using a single element of the subfield $GF(p^2)$, that such powers can be computed using arithmetic operations in $GF(p^2)$, and that arithmetic in the extension field $GF(p^6)$ can be avoided. Moreover, our exponentiation method is more than four times faster than other published methods to compute powers of elements of order dividing $p^2-p+1$.

In Section 2 we describe our new method to represent and calculate powers of subgroup elements. In Section 3 we explain how a proper subgroup generator can conveniently be found using the method from Section 2. Cryptographic applications are given in Section 4, along with comparisons with RSA and ECC and preliminary implementation results (section 4.6.2). In Section 5 we prove that the security of XTR is equivalent to the security offered by traditional subgroup approaches. Extensions are discussed in Section 6.

2. Subgroup Representation and Arithmetic 2.1 System Setup

Let $p \equiv 2 \mod 3$ be a prime number such that $6*\log_2(p) \approx 1024$ and such that $\phi_6(p)=p^2-p+1$ has a prime factor q with $\log_2(q) \geq 160$. Such p and q (or of any other reasonable desired size) can quickly be found by picking r such that $r^2-r+1$ is prime, by finding an integer k such that $r+k*(r^2-r+1)$ is prime and 2 mod 3, and by setting $q=r^2-r+1$ and $p=r+k*(r^2-r+1)$ for the resulting k. Note that the resulting p satisfies a degree two polynomial with small coefficients, and thus allows fast modular arithmetic. In particular if one restricts the search to k=1, the resulting p's will be of the form $r^2+1$ (note that in this case r must be even, and that p is 1 mod 4). On the other hand, such 'nice' p may be undesirable from a security point of view because they may make application of the Discrete Logarithm variant of the Number Field Sieve easier. Another method to generate p and q that does not have this disadvantage (and thus neither the advantage of fast arithmetic modulo p) works as follows: pick a prime $q \equiv 7 \mod 12$, find the two roots $r_1$ and $r_2$ of $x^2 - x + 1 \equiv 0 \mod q$, and find an integer k such that $p = r_i + k*q$ is 2 mod 3 and prime for i=1 or 2. If desired, primes q can be selected until the smallest or the largest root is prime, or any other straightforward variant that fits one's needs may be used, for instance to get $\log_2(q) \approx 180$ and $6*\log_2(p) \approx 3000$, i.e., $\log_2(p)$ considerably bigger than $\log_2(q)$. From $q \equiv 7 \mod 12$ it follows that $q \equiv 1 \mod 3$ so that, with quadratic reciprocity, $x^2 - x + 1 \equiv 0 \mod q$ has two roots. It also follows that $q \equiv 3 \mod 4$ which implies that those roots can be found using a single $((q+1)/4)^{th}$ powering modulo q.

By $g \in GF(p^6)$ we denote an element of order q. It is well known that g is not contained in any proper subfield of $GF(p^6)$ (cf. [13]). In the next section it is shown that there is no need for an actual representation of g and that arithmetic on elements of $GF(p^6)$ can be entirely avoided. Thus, there is no need to represent elements of $GF(p^6)$, for instance by constructing an irreducible $3^{rd}$ degree polynomial over $GF(p^2)$. A representation of $GF(p^2)$ is needed however. This is done as follows.

From $p \equiv 2 \mod 3$ it follows that p mod 3 generates $GF(3)^*$, so that the zeros $\alpha$ and $\alpha^p$ of the polynomial $(X^3-1)/(X-1) = X^2 + X + 1$ form an optimal normal basis for $GF(p^2)$ over $GF(p)$. Because $\alpha^i = \alpha^{i \mod 3}$, an element $x \in GF(p^2)$ can be represented as $x_0 \alpha + x_1 \alpha^p = x_0 \alpha + x_1 \alpha^2$ for $x_0, x_1 \in GF(p)$, so that $x^p = x_0^p + x_1^p \alpha^{2p} = x_1 + x_0 \alpha^2$. In this representation of $GF(p^2)$ an element t of $GF(p)$ is represented as $-t\alpha - t\alpha^2$, e.g. 3 is represented as $-3\alpha - 3\alpha^2$.

FIG. 5 is a flow diagram of the method for the selection of "p", as shown in section 2.1.

2.2 Cost of Arithmetic in $GF(p^2)$

It follows from the identity $x^p = x_1 \alpha + x_0 \alpha^2$ in 2.1 that $p^{th}$ powering of $x = x_0 \alpha + x_1 \alpha^2$ in $GF(p^2)$ is for free. Squaring in $GF(p^2)$ can be carried out at the cost of two squarings and a single multiplication in $GF(p)$, where as customary we do not count additions in $GF(p)$. Multiplication in $GF(p^2)$ can be done using four multiplications in $GF(p)$. These straightforward results can simply be reduced to three squarings and three multiplications, respectively, by using a Karatsuba-like approach (cf. [12, section 4.3.3]): to compute $(x_0 \alpha + x_1 \alpha^2) * (y_0 \alpha + y_1 \alpha^2)$ one computes $x_0 * y_0$, $x_1 * y_1$, and $(x_0 + x_1) * (y_0 + y_1)$, after which $x_0 * y_1 + x_1 * y_0$ follows using two subtractions. Furthermore, from $(x_0 \alpha + x_1 \alpha^2)^2 = x_1(x_1 - 2x_0) \alpha + x_0(x_0 - 2x_1) \alpha^2$ it follows that squaring in $GF(p^2)$ can be done at the cost of just two multiplications in $GF(p)$. Under the reasonable assumption that a squaring in $GF(p)$ takes 80% of the time of a multiplication in $GF(p)$ (cf. [5]), two multiplications is faster than three squarings. Thus we have the following.

Lemma 2.2.1. A squaring in $GF(p^2)$ can be done at the cost of two multiplications in $GF(p)$, and a multiplication in $GF(p^2)$ can be done at the cost of three multiplications in $GF(p)$.

Lemma 2.2.2. For x, y, $z \in GF(p^2)$, the computation of $x*z - y*z^p \in GF(p^2)$ can be done at the cost of four multiplications in $GF(p)$.

Proof. Let $x = x_0 \alpha + x_1 \alpha^2$, $y = y_0 \alpha + y_1 \alpha^2$, and $z = z_0 \alpha + z_1 \alpha^2$, so that $z^p = z_1 \alpha + z_0 \alpha^2$. The proof follows from the straightforward computation $x*z - y*z^p = (z_0(y_0 - x_1 - y_1) + z_1(x_1 - x_0 + y_1)) \alpha + (z_0(x_0 - x_1 + y_0) + z_1(y_1 - x_0 - y_0)) \alpha^2$.

The correctness of the following two auxiliary algorithms can easily be proved.

Algorithm 2.2.3, Inversion in $GF(p^2)$
Let $x = x_0 \alpha + x_1 \alpha^2 \in GF(p^2)$. Compute $t = (x_0 x_1 + (x_0 - x_1)^2)^{-1} \in GF(p)$, then $1/x = t(x_1 \alpha + x_0 \alpha^2) \in GF(p^2)$.

Algorithm 2.2.4, Exponentiation in $GF(p^2)$
Let $x \in GF(p^2)$ and let e be an integer. To compute $x^e \in GF(p^2)$ do the following.
1. Compute $e_0, e_1 \in \{0, 1, \ldots, p-1\}$ such that $e_0 + e_1 * p \equiv e \mod (p^2 - 1)$ and let $e_i = \sum_j e_{ij} 2^j$, with $e_{ij} \in \{0, 1\}$ for $i=0, 1$ and $j \geq 0$, be the binary representations of $e_0$ and $e_1$.
2. Let n be the largest index such that $e_{in} \neq 0$ for i=0 or 1;
3. Compute $x' = x * x^p \in GF(p)$;
4. Let $y = 1$ in $GF(p^2)$. For $j = n, n-1, \ldots, 0$ in succession do the following:
    If $e_{0j} = 1$ and $e_{1j} = 1$, then replace y by $y * x'$;
    If $e_{0j} = 1$ and $e_{1j} = 0$, then replace y by $y * x$;
    If $e_{0j} = 0$ and $e_{1j} = 1$, then replace y by $y * x^p$;
    If $j > 0$, then replace y by $y^2$;
5. Return $y = x^e \in GF(p^2)$.

Lemma 2.2.5. For $x \in GF(p^2)$ the computation of $x^e$ can be done at an expected cost of $4*\log_2(p)$ multiplications in $GF(p)$.

Proof. Algorithm 2.2.4 performs at most $n \leq \log_2(p)$ squarings in $GF(p^2)$ for a total of at most $2*\log_2(p)$ multiplications in $GF(p)$ (cf. Lemma 2.2.1). Per iteration, a multiplication by $x' \in GF(p)$, or by $x \in GF(p^2)$, or by $x^p \in GF(p^2)$ is carried out, each with probability 25%. The first takes two and the latter two take three multiplications in $GF(p)$ (cf. Lemma 2.2.1), for an expected total of $2/4 + 3/4 + 3/4 = 2$ multiplications in $GF(p)$ per iteration. The proof now follows.

Remark 2.2.6. Note that $x^e$ can be computed at an expected cost of $3.5 * \log_2(e)$ multiplications in $GF(p)$ using the ordinary square and multiply method (where $3.5 = 2 + 3/2$, cf. Lemma 2.2.1). So, if e is less than 15% longer than p the ordinary square and multiply method is faster than Algorithm 2.2.4.

2.3 Compact Representation of Powers of g and Their Conjugates

We present a number of straightforward results that show that powers of g, up to conjugacy, can be represented using a single element of $GF(p^2)$.

We recall the definition of the trace function $Tr(x)$ from $GF(p^6)$ onto $GF(p^2)$ mapping x to $x + x^{p^2} + x^{p^4}$. Because the order of $x \in GF(p^6)^*$ divides $p^6 - 1$ the function is well defined. For x, $y \in GF(p^6)$ and $c \in GF(p^2)$, $Tr(x+y) = Tr(x) + Tr(y)$ and $Tr(cx) = c * Tr(x)$. That is, $Tr(x)$ is $GF(p^2)$-linear.

Lemma 2.3.1. The minimal polynomial of g over $GF(p^2)$ is $X^3 - BX^2 + B^p X - 1 \in GF(p^2)[X]$ with $B = g + g^{p-1} + g^{-p} \in GF(p^2)$.

Proof. Because g is not contained in any proper subfield of $GF(p^6)$ it is a root of a unique monic irreducible polynomial $F(X) = X^3 - BX^2 + CX - D \in GF(p^2)[X]$. Because $F(X)^p = F(X^p)$ the roots of $F(X)$ are g and its conjugates $g^{p^2}$ and $g^{p^4}$. Because the order q of g divides $p^2 - p + 1$ and because $p^2 \equiv p - 1 \mod (p^2 - p + 1)$ and $p^4 \equiv -p \mod (p^2 - p + 1)$, we find that $g^{p^2} = g^{p-1}$ and $g^{p^4} = g^{-p}$ so that $$D = g * g^{p^2} * g^{p^4} = g * g^{p-1} * g^{-p} = g^{1+p-1-p} = 1$$

and $$B = g + g^{p^2} + g^{p^4} = g + g^{p-1} + g^{-p}.$$

Note that $B=\text{Tr}(g)$. From $F(g^{-p})=0$ it follows that $$g^{-3p}-Bg^{-2p}+Cg^{-p}-1=g^{-3p}(1-Bg^p+Cg^{2p}-g^{3p})=g^{-3p}(1-B^{1/p}g+C^{1/p}g^2-g^3)^p=0.$$

Because $F(X)$ is the unique monic irreducible polynomial in $GF(p^2)[X]$ that has g as a root it follows that $B=C^{1/p}$, i.e., $C=B^p$, which finishes the proof.

Remark 2.3.2. The identity $C=B^p$ in the proof of Lemma 2.3.1 also follows from $$C=g*g^{p-1}+g*g^{-p}+g^{p-1}*g^{-p}+g^p+g^{1-p}+g^{-1}$$

and $$B^p=(g+g^{p-1}+g^{-p})^p=g^p+g^{-1}+g^{1-p}$$

since $p^2-p\equiv-1 \bmod (p^2-p+1)$ and $-p^2\equiv 1-p \bmod (p^2-p+1)$.

Based on Lemma 2.3.1 it is tempting to represent g and its conjugates by $\text{Tr}(g)$. We show that a result similar to Lemma 2.3.1 holds for any power of g and its conjugates. Consequently, $g^n$ and its conjugates can be represented by $\text{Tr}(g^n)$. For notational convenience we use the following definition.

Definition 2.3.3. Let $T(n)=\text{Tr}(g^n)\in GF(p^2)$. Note that $T(n)=g^n+g^{np-n}+g^{-np}$ and that $T(1)=B$ with B as in Lemma 2.3.1.

Lemma 2.3.4. $T(np)=T(n)^p=g^{-n}+g^{n-np}+g^{np}=T(-n)$.

Proof. Immediate from the definition of $T(n)$ and from $$g^{np}+g^{np^2-np}+g^{-np^2}=g^{-n}+g^{n-np}+g^{np}=T(-n)$$

as in Remark 2.3.2.

Lemma 2.3.5. For any integer n the roots of the polynomial $X^3-T(n)X^2+T(n)^pX-1\in GF(p^2)[X]$ are $g^n$ and its conjugates $g^{np^2}=g^{np-n}$ and $g^{np^4}=g^{-np}$.

Proof. We compare the coefficients with the coefficients of the polynomial $(X-g^n)(X-g^{np-n})(X-g^{-np})$. The coefficient of $X^2$ follows from Definition 2.3.3, the constant coefficient from $g^{n+np-n-np}=1$, and the coefficient of X from $$g^{n+np-n}+g^{n-np}+g^{np-n-np}=g^{np}+g^{n-np}g^{-n}$$

and Lemma 2.3.4.

2.4 Computing $T(n)$ for Arbitrary n

We show that $T(n)$ can efficiently be computed for any integer n.

Lemma 2.4.1. $T(u+v)=T(u)*T(v)-T(v)^p*T(u-v)+T(u-2v)$.

Proof. Immediate from the definition of $T(u)$ and $T(v)^p=T(-v)$ (cf. Lemma 2.3.4).

Corollary 2.4.2. Given $B=T(1)$ as in Lemma 2.3.1, $T(n-1)$, $T(n)$, and $T(n+1)$, the cost of the computation of
  i. $T(2n)=T(n)^2-2T(n)^p$ is two multiplications in $GF(p)$;
  ii. $T(n+2)=B*T(n+1)-B^p*T(n)+T(n-1)$ is four multiplications in $GF(p)$;
  iii. $T(2n-1)=T(n-1)*T(n)-B^p*T(n)^p+T(n+1)^p$ is four multiplications in $GF(p)$;
  iv. $T(2n+1)=T(n+1)*T(n)-B*T(n)^p+T(n-1)^p$ is four multiplications in $GF(p)$;

Proof.
  i. This follows from the fact that pth powering is for free in $GF(p^2)$, Lemma 2.2.1, Lemma 2.4.1 with $u=v=n$, $T(0)=3$, and Lemma 2.3.4:

$$T(2n)=T(n)^2-T(n)^p*T(0)+T(-n)=T(n)^2-3T(n)^p+T(n)^p=T(n)^2-2T(n)^p.$$

ii. This follows similarly from Lemma 2.2.2 and Lemma 2.4.1 with $u=n+1$ and $v=1$.
  iii. As ii with $u=n-1$, $v=n$ and with Lemma 2.3.4.
  iv. As iii with $u=n+1$, $v=n$.

Definition 2.4.3. Let $S(n)=(T(n-1), T(n), T(n+1))$.

Algorithm 2.4.4, Computation of $S(n)$ Given $B=T(1)$

If $n<0$, apply this algorithm to $-n$ and use Lemma 2.3.4. If $n=0$, then $S(0)=(B^p, 3, B)$; if $n=1$, then $S(1)=(3, B, B^2-2B^p)$ (cf. Corollary 2.4.2.i); if $n=2$, use Corollary 2.4.2.ii and $S(1)$ to compute $T(3)$ and thereby $S(2)$. Otherwise, to compute $T(n)$ for $n>2$ let $k=3$, $m=n$, and compute $S(k)$ using Corollary 2.4.2.ii and $S(2)$. If m is even, then replace m by $m-1$ and next let $m=\Sigma_{0\leq i\leq r}m_i 2^i$ with $m_i\in\{0,1\}$ and $m_r=1$. For $i=r-1, r-2, \ldots, 1$ in succession do the following:
  If $m_i=0$, then replace $S(k)=(T(k-1), T(k), T(k+1))$ by $S(2k-1)=(T(2k-2), T(2k-1), T(2k))$ and k by $2k-1$, using Corollary 2.4.2.i for $T(2k-2)$ and $T(2k)$ and Corollary 2.4.2.iii for $T(2k-1)$.
  If $m_i=1$, then replace $S(k)=(T(k-1), T(k), T(k+1))$ by $S(2k+1)=(T(2k), T(2k+1), T(2k+2))$ and k by $2k+1$, using Corollary 2.4.2.i for $T(2k)$ and $T(2k+2)$ and Corollary 2.4.2.iv for $T(2k+1)$.

Finally, if n is even replace $S(k)=(T(k-1), T(k), T(k+1))$ by $S(k+1)$ $(T(k), T(k+1), T(k+2))$ and k by $k+1$ using Corollary 2.4.2.i. As a result we have that $k=n$ so that $S(n)=S(k)$.

FIG. 6 is a flow diagram of the arithmetic method to support key generation, as shown in Algorithm 2.4.4.

Theorem 2.4.5. The representation $T(n)$ of the nth power of g and its conjugates can be computed at a cost of $8*\log_2(n)$ multiplications in $GF(p)$.

Proof. Immediate from Algorithm 2.4.4 and Corollary 2.4.2.

Remark 2.4.6. We find that the computation of $T(n)$ for $n\approx q$ can be performed at a cost of $8*\log_2(q)$ multiplications in $GF(p)$. This is more than 75% faster than the $37.8*\log_2(q)$ multiplications in $GF(p)$ required by the method from [13] where powers of g are represented as elements of a particularly efficient $6^{th}$ degree extension of $GF(p)$ and which is substantially faster than standard methods to deal with subgroups. For this estimate we assume that $\log_2(q)\approx\log_2(p)$ and that in $GF(p)$ a squaring takes 80% of the time of a multiplication (cf. [5]). If elements of $<g>$ are represented using a $3^{rd}$ degree extension of $GF(p^2)$, then exponentiation takes $40.5*\log_2(q)$ multiplications in $GF(p)$, due to the fact that arithmetic in $GF(p^2)$ is fast and because an extension polynomial of the special form $X^3-BX^2+B^pX-1$ may be used. Unlike the methods from for instance [2], we do not assume that p has a special form. Using such primes leads to additional savings by making the arithmetic in $GF(p)$ faster (cf. Section 2.1).

Remark 2.4.7. The only difference between the two different cases in Algorithm 2.4.4 (i.e., if the bit is off or on) is the application of Corollary 2.4.2.iii if the bit is off, and of Corollary 2.4.2.iv if the bit is on. The two computations involved, however, are very similar and take the same number of instructions. Thus, the instructions carried out in Algorithm 2.4.4 for the two different cases are very much alike. This is a rather unusual property for an exponentiation routine and makes Algorithm 2.4.4 much less susceptible to environmental attacks than usual exponentiation routines. Examples of environmental attacks are timings attacks and Differential Power Analysis.

2.5 Computing Products of Powers

Efficient representation and computation of powers of g suffices for the implementation of many cryptographic protocols. Sometimes, however, the product of two powers of g must be computed. For the standard representations this is straightforward, but in our representation computing products is relatively complicated. Here we describe how the problem of computing the product of two powers of g may be solved. Our description is geared towards cryptographic applications, but can easily be generalized. Let B represent a generator g of a subgroup of order q dividing $p^2-p+1$, as in Lemma 2.3.1. Let $y=g^k$ for a secret integer k (the private key), and let $C=y+y^{p-1}+y^{-p}$ be y's representation. We may assume that $0<k<q$. We also assume that $k \neq \pm p \bmod q$ and that $k \neq \pm(p-1) \bmod q$ (cf. Remark 4.5.9). Obviously, this limitation on the choice of k does not have a negative impact on the security.

The owner of the private key k can easily arrange the computation of C such that the representations $C_+$ of $g*y=g^{k+1}$ and $C_-$ of $y/g=g^{k-1}$ are computed as well (cf. Algorithm 2.4.4). We show that if B, C, $C_+$, and $C_-$ are known, then for any pair of integers a, b the representation of $g^a*y^b$ and its conjugates can be computed efficiently.

Lemma 2.5.1. Let T(m) be the representation of $g^m$ and its conjugates, and let $$A = \begin{pmatrix} B & -B^p & 1 \\ 1 & 0 & 0 \\ 0 & 1 & 0 \end{pmatrix}$$

be a matrix over $GF(p^2)$. Then $$\begin{pmatrix} T(n+1) \\ T(n) \\ T(n-1) \end{pmatrix} = A^n * \begin{pmatrix} T(1) \\ T(0) \\ T(-1) \end{pmatrix},$$

where $T(1)=B$, $T(0)=3$, and $T(-1)=B^p$ (cf. 2.3.3 and 2.3.4).

Proof. From the definition of A and $T(n+1)=B*T(n)-B^p*T(n-1)+T(n-2)$ (cf. Corollary 2.4.2.ii) it follows that $$\begin{pmatrix} T(n+1) \\ T(n) \\ T(n-1) \end{pmatrix} = A * \begin{pmatrix} T(n) \\ T(n-1) \\ T(n-2) \end{pmatrix}.$$

The proof follows by induction. Thus, if for the representations T(u) and T(v) of $g^u$ and $g^v$ the uth and vth powers of A are known, then the representation T(u+v) of $g^{u+v}$ can simply be computed by applying Lemma 2.5.1 with n=u+v to $A^{u+v}=A^u*A^v$. We show how $A^u$ can be obtained from T(u), if T(u+1) and T(u-1) are known as well.

Lemma 2.5.2. Given T(0), T(1), T(-1), T(n), T(n+1), and T(n-1) the matrix $A^n$ can be computed as $$A^n = \begin{pmatrix} T(n) & T(n+1) & T(n+2) \\ T(n-1) & T(n) & T(n+1) \\ T(n-2) & T(n-1) & T(n) \end{pmatrix} \begin{pmatrix} T(0) & T(1) & T(2) \\ T(-1) & T(0) & T(1) \\ T(-2) & T(-1) & T(0) \end{pmatrix}^{-1}$$

in a small constant number of operations in $GF(p^2)$.

Proof. Given T(0), T(1), T(-1), T(n), T(n+1), and T(n-1), Corollary 2.4.2.ii is used to compute T($\pm 2$) and T(n$\pm 2$). As in the proof of Lemma 2.5.1 it follows that $$\begin{pmatrix} T(n) & T(n+1) & T(n+2) \\ T(n-1) & T(n) & T(n+1) \\ T(n-2) & T(n-1) & T(n) \end{pmatrix} = A^n * \begin{pmatrix} T(0) & T(1) & T(2) \\ T(-1) & T(0) & T(1) \\ T(-2) & T(-1) & T(0) \end{pmatrix}.$$

The proof follows by observing that $$\begin{pmatrix} T(-2) & T(-1) & T(0) \\ T(-1) & T(0) & T(1) \\ T(0) & T(1) & T(2) \end{pmatrix}$$

is the product of the Vandermonde matrix $$\begin{pmatrix} g^{-1} & g^{-p^2} & g^{-p^4} \\ 1 & 1 & 1 \\ g & g^{p^2} & g^{p^4} \end{pmatrix}$$

and its transpose, and therefore invertible. The determinant of the latter matrix equals $T(p+1)^p - T(p+1)$, and $(T(p+1)^p - T(p+1))^2 = B^{2p+2} + 18B^{p+1} - 4(B^{3p} + B^3) - 27 = D \in GF(p)$. Because $p^{th}$ powering is for free in $GF(p^2)$, the proof follows. We have that $$\begin{pmatrix} T(0) & T(1) & T(2) \\ T(-1) & T(0) & T(1) \\ T(-2) & T(-1) & T(0) \end{pmatrix}^{-1} =$$

$$\frac{1}{D} \begin{pmatrix} 9 - B^{p+1} & B^{2+p} - 2B^{2p} - 3B & 6B^p - 2B^2 \\ (B^{2+p} - 2B^{2p} - 3B)^p & 9 - (B^2 - 2B^p)^{p+1} & B^{2+p} - 2B^{2p} - 3B \\ (6B^p - 2B^2)^p & (B^{2+p} - 2B^{2p} - 3B)^p & 9 - B^{p+1} \end{pmatrix}.$$

Algorithm 2.5.3, Computation of the Representation of $g^a*y^b$ for Integers a, b with $1<a$, $b<q$, Given the Representation B of g and the Representations C, $C_+$, and $C_-$ of y, y*g, and y/g, Respectively
1. Compute $c=a/b \mod q$.
2. Given B use Algorithm 2.4.4 to compute $S(c)=(T(c-1), T(c), T(c+1))$.
3. Use Lemma 2.5.2 with $T(0)=3$, $T(1)=B$, $T(-1)=B^p$, $T(c)$, $T(c+1)$, and $T(c-1)$ to compute $A^c$.
4. Use Lemma 2.5.1 with $A^c$ applied to the vector $(C_+, C, C_-)^T$ to compute $T(c+k)$; notice that k is unknown.
5. Use Algorithm 2.4.4 with B replaced by $T(c+k)$ and n replaced by b to compute the representation $T((c+k)*b)=T(a+k*b)$ of $g^a*y^b$.

FIG. 10A is a flow diagram of the arithmetic method to support generating digital signatures, as shown in Algorithm 2.5.3.

Theorem 2.5.4. For N-bit numbers a and b, the representation of $g^a*y^b$ and its conjugates can be computed at a cost of $16*N+34$ multiplications in $GF(p)$.

Proof. Only the middle row of the first matrix on the right hand side of the expression for $A''$ in Lemma 2.5.2 is needed to compute $T(c+k)$ in Step 4. Since the computation of the second matrix may be considered to be for free (cf. expression at the end of the proof of Lemma 2.5.2), the proof now follows from Algorithm 2.5.3, Theorem 2.4.5, and Lemma 2.2.1, combined with a simple analysis of the cost of the matrix vector operations.

Remark 2.5.5. We find that the computation of the representation of $g^a*y^b$ for $a \approx b \approx q$ can be performed at a cost of $16*\log_2(q)+34$ multiplications in $GF(p)$. If the more traditional but fast method from [13] is used to represent $GF(p^6)$, then computation of the representation of $g^a*y^b$ takes almost $47*\log_2(q)$ multiplications in $GF(p)$. If elements of $<g>$ are represented using a $3^{rd}$ degree extension of $GF(p^2)$ (cf. Remark 2.4.6), then computing $g^a*y^b$ takes about $50*\log_2(q)$ multiplications in $GF(p)$. We conclude that both single and double exponentiations can be done much faster using our representation than using previously published techniques.

3. Fast Initialization

We consider the problem of computing a proper initial B as in Lemma 2.3.1, i.e., an element B of $GF(p^2)$ such that there is a $g \in GF(p^6)$ of order q dividing $p^2-p+1$ with $B=g+g^{p-1}+g^{-p}$. We describe three different ways to solve this problem, ranging from a slow and inconvenient but easily understandable approach to a fast and simple method that needs some additional theoretical justification.

3.1 Straightforward Approach

Algorithm 3.1.1, Computation of B
1. Pick at random a third degree monic irreducible polynomial over $GF(p^2)$, and use that polynomial for representation of and arithmetic on elements of $GF(p^6)$.
2. Pick at random an element $h \in GF(p^6)^*$;
3. Compute the $((p^6-1)/q)$th power g of h;
4. If $g=1$, then return to Step 2;
5. Compute $B=g+g^{p-1}+g^{-p}$.

Theorem 3.1.2. Algorithm 3.1.1 can be expected to require 3 irreducibility tests over $GF(p^2)$ of third degree monic polynomials in $GF(p^2)[X]$, and $q/(q-1)$ exponentiations in $GF(p^6)^*$ with exponent $(p^6-1)/q$.

Proof. Immediate from the well known fact that a random monic third degree polynomial in $GF(p^2)[X]$ is irreducible with probability ⅓.

Although conceptually easy, Algorithm 3.1.1 requires actual representation of and manipulation with elements of $GF(p^6)$. From an implementation point of view it is therefore less attractive. Note that a random third degree polynomial $H(X)$ in $GF(p^2)[X]$ can be tested for irreducibility by testing if $\gcd(X^{p^2}-X, H(X))=1$ in $GF(p^2)[X]$. This requires about $2*\log_2(p)$ squarings and $\log_2(p)$ multiplications of elements of $GF(p^2)[X]/(H(X))$, which is relatively expensive.

3.2 Randomized Approach Using Irreducibility

Algorithm 3.2.1, Computation of B
1. Pick at random an element $B' \in GF(p^2)^* \backslash GF(p)^*$;
2. If $X^3-B'X^2+B'^pX-1 \in GF(p^2)[X]$ is reducible, then return to Step 1;
3. Use Algorithm 2.4.4 with B replaced by B' to compute $T((p^2-p+1)/q)$;
4. If $T((p^2-p+1)/q)=3$, then return to Step 1;
5. Let $B=T((p^2-p+1)/q)$.

To justify Algorithm 3.2.1 we use the following two lemmas.

Lemma 3.2.2. An irreducible polynomial of the form $X^3-B'X^2+B'^pX-1 \in GF(p^2)[X]$ is the minimal polynomial of an element of $GF(p^6)$ of order $>3$ and dividing $p^2-p+1$.

Lemma 3.2.3. For a randomly selected $B' \in GF(p^2)^* \backslash GF(p)^*$ the probability that the polynomial $X^3-B'X^2+B'^pX-1 \in GF(p^2)[X]$ is irreducible is about one third.

Lemma 3.2.2 proves that it makes sense to apply Algorithm 2.4.4 with B replaced by B', because the role of g in Section 2 is played by some (unknown) element of $GF(p^6)$ of order dividing $p^2-p+1$. This works because g never explicitly occurs in the computations in Algorithm 2.4.4 (except to compute B, which is replaced by B' for our current purposes).

Lemma 3.2.3 proves that on average only about three different values for B' have to be selected before an irreducible polynomial is found. The proof of the following theorem is immediate.

Theorem 3.2.4. Algorithm 3.2.1 can be expected to require $3*q/(q-1)$ irreducibility tests over $GF(p^2)$ of third degree monic polynomials of the form $X^3-B'X^2+B'^pX-1$ in $GF(p^2)[X]$, and $q/(q-1)$ applications of Algorithm 2.4.4 with $n=(p^2-p+1)/q$.

Proof of Lemma 3.2.2. Because $X^3-B'X^2+B'^pX-1 \in GF(p^2)[X]$ is irreducible its roots are in $GF(p^6)^* \backslash GF(p^2)$ and thus of order dividing $(p^6-1)/(p^2-1)=p^4+p^2+1$. Denote the roots by h and its conjugates $h^{p^2}$ and $h^{p^4}=h^{-p^2-1}$, the latter because the order of h divides $p^4+p^2+1$. If $h^3=1$, then $h^{p^2}$ would be equal to h since $p \equiv 2 \mod 3$, and h would be in $GF(p^2)$ contradicting the irreducibility. Because the order of h cannot be even, it follows that the order of h is $>3$. Reversing the argument in the proof of Lemma 2.3.1 it follows that if h is a root, then so is $h^{-p}$. Thus either $h=h^{-p}$, or $h^{p^2}=h^{-p}$, or $h^{-p^2-1}=h^{-p}$. The first two possibilities are in contradiction with the fact that the order of h divides $p^4+p^2+1$, that $\gcd(p^4+p^2+1, p+1)=3$, and that the order of h is $>3$, and the last remaining possibility leads to the conclusion that the order of h divides $p^2-p+1$.

Proof of Lemma 3.2.3. This follows from a straightforward counting argument. About $p^2-p$ elements of the subgroup of order $p^2-p+1$ of $GF(p^6)^*$ are roots of monic irreducible polynomials of the form $X^3-B'X^2+B'^pX-1 \in GF(p^2)[X]$ (cf. Lemma 2.3.1). Since each of these polynomials has three distinct roots, there must be about $(p^2-p)/3$ different values for B' in $GF(p^2)^* \backslash GF(p)^*$ such that $X^3-B'X^2+B'^pX-1$ is irreducible.

Compared to Algorithm 3.1.1, the arithmetic in $GF(p^6)$ is replaced in Algorithm 3.2.1 by application of Algorithm 2.4.4. That is much more convenient for the implementation of our method, because Algorithm 2.4.4 is required anyhow. In the next section we show that the irreducibility test in Step 2 of Algorithm 3.2.1 can be replaced by an application of Algorithm 2.4.4 as well. In the remainder of this section we describe a fast way to perform the irreducibility test based on Scipione del Ferro's classical method to compute the roots of a third degree equation. This method is relatively complicated compared to the simple application of Algorithm 2.4.4 in Algorithm 3.3.8 in the next section. Nevertheless, we present it in detail because it is faster than using Algorithm 2.4.4 and because it can be used also to reduce the size of the public key, as shown in Section 4.5.

We first present Scipione del Ferro's method in its full generality, followed by its consequences for the polynomial $X^3-B'X^2+B'^pX-1\epsilon GF(p^2)[X]$ and its slightly simpler formulation to test $X^3-B'X^2+B'^pX-1$ for irreducibility.

Scipione del Ferro, 3.2.5 (cf. [16: page 559]). To find the roots of the polynomial $F(X)=aX^3+bX^2+cX+d$ in a field of characteristic unequal to 2 or 3, perform the following steps.

1. Compute the polynomial $G(X)=F(X-b/(3a))=X_3+G_1X+G_0$ with $G_1=(3ac-b^2)/(3a^2)$ and $G_0=(27a^2d-9abc+2b^3)/(27a^3)$.
2. Compute the discriminant $\Delta=G_0^2+4G_1^3/27$ of the polynomial $X^2+G_0X-(G_1/3)^3$, and compute its roots $r_{1,2}=(-G_0+\sqrt{\Delta})/2$.
3. Compute a third root u of $r_1$, and let $v=-G_1/(3u)$ (cf. Algorithm 2.2.3). Note that v is a third root of $r_2$.
4. The roots of $F(X)$ are $u+v-b/(3a)$, $uw+vw^2-b/(3a)$, and $uw^2+vw-b/(3a)$, where w be a non-trivial cube root of unity, i.e., $w^3=1$ and $w^2+w+1=0$.

Note that w in Step 4 is an element of $GF(p^2)$ and that, in the setting of XTR, w is equal to the element $\alpha$ as introduced in Section 2.1.

Theorem 3.2.6. Let $F(X)\epsilon=GF^2[x]$ be such that $\Delta$ as in Step 2 of 3.2.5 is in $GF(p)$. The following four statements are equivalent.
1. $F(X)$ is reducible over $GF(p^2)[X]$.
2. $F(X)$ has a root in $GF(p^2)$.
3. $F(X)$ has three roots in $GF(p^2)$.
4. The roots $r_1$ and $r_2$ as in Step 2 of 3.2.5 are cubes in $GF(p^2)$.

Proof. $1\Leftrightarrow 2$ and $3\Rightarrow 2$ are trivial. We prove $2\Leftrightarrow 4$ and $4\Rightarrow 3$.

'$4\Rightarrow 2$'. If there is a u in $GF(p^2)$ such that $u^3=r_1$, then $u-G_1/(3u)-b/(3a)$ is a root of $F(X)$ in $GF(p^2)$ (Cf. Step 4 of 3.2.5).

'$2\Rightarrow 4$'. If $F(X)$ has a root in $GF(p^2)$, then there is a cube root u of $r_1$ such that $u+v-b/(3a)$ is in $GF(p^2)$, with $v=-G_1/(3u)$, so that $u+v$ is in $GF(p^2)$. Since also $uv=-G_1/3$ is in $GF(p^2)$, it follows that u is in $GF(p^4)$. On the other hand, $r_1$, $r_2\epsilon GF(p^2)$ because $\Delta\epsilon GF(p)$. Since $u^3=r_1$, it follows that $u\epsilon GF(p^6)$. From $u\epsilon GF(p^4)$ and $u\epsilon GF(p^6)$ it follows that $u\epsilon GF(p^2)$ so that $r_1$ is a cube in $GF(p^2)$. It follows from $r_2=(-G_1/(3u))^3$ that $r_2$ is a cube in $GF(p^2)$ as well.

'$4\Rightarrow 3$'. If $u-G_1/(3u)-b/(3a)$ is a root of $F(X)$ in $GF(p^2)$ with u in $GF(p^2)$ then $uw-G_1w^2/(3u)-b/(3a)$ and $uw^2-G_1w/(3u)-b/(3a)$, with $W\epsilon GF(p^2)$ as in Step 4, are the two other roots of $F(X)$ (cf. Step 4 of 3.2.5), and they are both in $GF(p^2)$.

Corollary 3.2.7. The polynomial $X^3-B'X^2+B'^pX-1\epsilon GF(p^2)[X]$ is reducible over $GF(p^2)[X]$ if and only if the $r_1$ from Step 2 of 3.2.5 that results from an application of Algorithm 3.2.5 to $F(X)=X^3-B'X^2+B'^pX-1$, is a cube in $GF(p^2)$.

Proof. It follows from a straightforward computation that $\Delta$ as in Step 2 of 3.2.5 equals $1-2B'^{p+1}/3-B'^{2p+2}/27+4(B'^3+B'^{3p})/27$. This implies that $\Delta^p=\Delta$ so that $\Delta\epsilon GF(p)$. The proof now follows from Theorem 3.2.6 and 3.2.5.

An element $x\epsilon GF(p^2)$ is a cube if and only if $x^{(p^2-1)/3}=1$, which is the case if and only if $x^{p(p+1)/3}=x^{(p+)/3}$. Thus, testing if an element of $GF(p^2)$ is a cube can be done at the cost of a $(p+1)/3^{th}$ powering in $GF(p^2)$ followed by a free $p^{th}$ powering. Combined with Corollary 3.2.7, the correctness of the following algorithm follows immediately. See Algorithm 4.5.11 for general cube root computation of elements of $GF(p^2)$.

Algorithm 3.2.8

To decide if $F(X)=X^3-B'X^2+B'^pX-1\epsilon GF(p^2)[X]$ as above is irreducible over $GF(p^2)[X]$, perform the following steps.

1. Compute the polynomial $G(X)=F(X+B'/3)=X^3+G_1X+G_0\epsilon GF(p^2)[X]$ with $G_1=B'^p-B'^2/3$ and $G_0=(-27+9B'^{p+1}-2B'^3)/27$. This is possible because $p\neq 3$.
2. Compute a root $r_1\epsilon GF(p^2)$ (cf. Corollary 3.2.7) of the polynomial $X^2+G_0X-(G_1/3)^3$: $r_1=(-G_0+\sqrt{\Delta})/2$, with $\Delta=G_0^2+4G_1^3/27\epsilon GF(p)$. This is possible because $p\neq 2$, 3. It can be proved that $\Delta$ is a quadratic residue in $GF(p)$ (cf. Appendix A), which, in the case that $p\equiv 3 \mod 4$, implies that the computation of $r_1$ is equivalent to a $((p+1)/4)^{th}$ powering in $GF(p)$.
3. Compute $y=r_1^{(p+1)/3}$ in $GF(p^2)$. The polynomial $F(X)$ is irreducible over $GF(p^2)$ if and only if $y\neq y^p$.

Remark 3.2.9. Assuming that a squaring in $GF(p)$ takes 80% of the time of a multiplication (cf. Remark 2.4.6), the computation of $r_1$ in Step 2 of Algorithm 3.2.8 can be expected to require $1.3*\log_2(p)$ multiplications in $GF(p)$ if $p\equiv 3 \mod 4$ (only slightly more expensive otherwise). Step 3 of Algorithm 3.2.8 can be expected to take $\log_2(p)$ squarings in $GF(p^2)$ and $0.5*\log_2(p)$ multiplications in $GF(p^2)$, for an expected total of $3.5*\log_2(p)$ multiplications in $GF(p)$ (cf. Lemma 2.2.1). Thus, the total expected cost of an application of Algorithm 3.2.8 is $4.8*\log_2(p)$ multiplications in $GF(p)$. With Theorem 3.2.4 it follows that a proper B can be found at an expected cost of about $(3*4.8+8)*\log_2(p)=22.4*\log_2(p)$ multiplications in $GF(p)$ (assuming p and q are of the same order of magnitude).

3.3 Randomized Approach without Irreducibility

If B' as in Step 1 of Algorithm 3.2.1 leads to an irreducible polynomial in Step 2, then we know that T(n) corresponds to the sum of the conjugates of the nth powers of an element of order dividing $p^2-p+1$ and we know how to compute T(n) efficiently based on B'. We now consider what we can say about a thus computed T(n) if the polynomial in Step 2 of Algorithm 3.2.1 is not known to be irreducible. This leads to results that are very similar to those of Section 2, but the proofs are slightly more cumbersome.

Let B' be an element of $GF^2)$ and let $\beta$, $\gamma$ and $\delta$ be the, not necessarily distinct, roots of $F(X)=X^3-B'X^2+B'^pX-1\epsilon GF(p^2)[X]$.

Lemma 3.3.1.
  i. $B'=\beta+\gamma+67$;
  ii. $\beta*\gamma*\delta=1$;
  iii. $\beta^n*\gamma^n+\beta^n*\delta^n+\gamma^n*\delta^{-n}+\gamma^{-n}+\beta^{-n}$ for any integer n.

Proof. Immediate. Note that iii uses ii.

If $F(X)$ is irreducible, then it follows from Lemma 3.2.2 that $\beta$, $\gamma$ and $\delta$ are of the form $g$, $g^{p-1}$, $g^{-p}$ for some g in $GF(p^6)$ of order>3 and dividing $p^2-p+1$. If $F(X)$ is reducible, we have the following lemma.

Lemma 3.3.2. If $F(X)$ is reducible, then $\beta, \gamma, \delta$ are in $GF(p^2)$.

Proof. Immediate from Theorem 3.2.6 and the proof of Corollary 3.2.7. We give an independent proof. Using the same argument as in the proof of Lemma 3.2.2 we find that $\beta^{-p}, \gamma^{-p}$ and $\delta^{-p}$ are also roots of $F(X)$. Without loss of generality, we find that either $\beta=\beta^{-p}, \gamma=\gamma^{-p}, \delta=\delta^{-p}$, or $\beta=\beta^{-p}, \delta=\gamma^{-p}, \gamma=\delta^{-p}$, or $\gamma=\beta^{-p}, \delta=\gamma^{-p}, \beta=\delta^{-p}$. In the first case all roots have order divisible by p+1, so that they are all in $GF(p^2)$. In the second case $\beta$ has order divisible by p+1 and $\gamma$ and $\delta$ have order divisible by $p^2-1$, so that they are again all in $GF(p^2)$. In the final case it follows that $1=\beta*\gamma*\delta=\beta*\beta^{-p}*\beta^{p^2}=\beta^{1-p+p^2}=\gamma^{1-p+p^2}=\delta^{1-p+p^2}$. Because $F(X)$ is reducible, at least one root, say $\beta$, is in $GF(p^2)$, so that the order of $\beta$ divides $\gcd(p^2-p+1,p^{2+1})=3$ (since $p\equiv 2 \bmod 3$). But from $\beta^3=1, \gamma=\beta^{-p}$, and $\delta=\gamma^{-p}$ it now follows that $\beta=\gamma=\delta=\beta^{-p}$ so that the third case does not occur but is covered by the first case.

Definition 3.3.3. Let $V(n)=\beta^n+\gamma^n+\delta^n$. Note that $V(1)=B'$ and that $V(n)\in GF(p^2)$ because $V(n)=T(n)$ if $F(X)$ is irreducible and $\beta, \gamma, \delta \in GF(p^2)$ otherwise.

Lemma 3.3.4. $V(np)=V(n)^p=\beta^{-n}+\gamma^{-n}\delta^{-n}=V(-n)$.

Proof. From the proof of Lemma 3.3.2 it follows that $\beta+\gamma+\delta=\beta^{-p}+\gamma^{-p}+\delta^{-p}$ and, more generally, that $\beta^m+\gamma^m+\delta^m=\beta^{-mp}+\gamma^{-mp}+\delta^{-mp}$ for any integer m. The proof follows by taking $m=-n$.

Lemma 3.3.5. For any integer n the roots of the polynomial $X^3-V(n)X^2+V(n)^p X-1 \in GF(p^2)[X]$ are $\beta^n, \gamma^n$, and $\delta^n$.

Proof. If $F(X)$ is irreducible the result follows from Lemma 2.3.5, so let us assume that $F(X)$ is reducible. As in the proof of Lemma 2.3.5 we compare the coefficients with the coefficients of the polynomial $(X-\beta^n)(X-\gamma^n)(X-\delta^n)$. The coefficient of $X^2$ follows from Definition 3.3.3, the constant coefficient from Lemma 3.3.1.ii, and the coefficient of X from Lemma 3.3.1.iii and Lemma 3.3.4.

It follows from Lemmas 2.3.5 and 3.3.5 that even if $F(X)$ is reducible, $V(n)$ and $T(n)$ play very similar roles, because they can be used in the same way to define a polynomial that has the nth powers of the roots of $F(X)$ as its roots. We now show that $V(n)$ can be computed in the same way as $T(n)$.

Lemma 3.3.6. $V(u+v)=V(u)*V(v)-V(v)^p*V(u-v)+V(u-2v)$.

Proof. Immediate from the definition of $V(u)$ and $V(v)^p=V(-v)$ (cf. Lemma 3.3.4).

Algorithm 2.4.4 is based on Corollary 2.4.2, which is based on Lemma 2.4.1. Lemma 3.3.6 is the equivalent of Lemma 2.4.1 with T replaced by V. Therefore, $V(n)$ can be computed using Algorithm 2.4.4 with B replaced by B' and T replaced by V.

Lemma 3.3.7. $F(X) \in GF(p^2)[X]$ is reducible if and only if $V(p+1) \in GF$.

Proof. If $F(X)$ is reducible then $\beta, \gamma, \delta \in GF(p^2)$ (Lemma 3.3.2) so that $\beta^{p+1}, \gamma^{p+1}, \delta^{p+1} \in GF(p)$ and thus $V(p+1)=\beta^{p+1}+\gamma^{p+1}+\delta^{p+1} \in GF(p)$. If $V(p+1) \in GF(p)$, then $V(p+1)^p=V(p+1)$, so that $X^3-V(p+1)X^2+V(p+1)X-1$ has 1 as a root. Because the roots of $X^3-V(p+1)X^2+V(p+1)X-1$ are the (p+1)st powers of the roots of $F(X)$ (cf. Lemma 3.3.5), it follows that $F(X)$ has a root of order dividing p+1, so that $F(X)$ is reducible over $GF(p^2)$.

This leads to the following algorithm to find a proper initial B as in Lemma 2.3.1.

Algorithm 3.3.8, Computation of B
1. Pick at random an element $B' \in GF(p^2)^*\backslash GF(p)^*$;
2. Use Algorithm 2.4.4 with B replaced by B' and T replaced by V to compute $V(p+1)$;
3. If $V(p+1) \in GF(p)$, then return to Step 1;
4. Use Algorithm 2.4.4 with B replaced by B' to compute $T((p^2-p+1)/q)$;
5. If $T((p^2-p+1)/q)=3$, then return to Step 1;
6. Let $B=T((p^2-p+1)/q)$.

FIG. 7 is a flow diagram of the method of key generation, as shown in Algorithm 3.3.8.

Theorem 3.3.9. Algorithm 3.3.8 computes an element $B \in GF(p^2)$ such that $B=g+g^{p-1}+g^{-p}$ for an element g of $GF(p^6)$ of order q>3 dividing $p^2-p+1$. It can be expected to require $3*q/(q-1)$ applications of Algorithm 2.4.4 with $n=p+1$ and $q/(q-1)$ applications of Algorithm 2.4.4 with $n=(p^2-p+1)/q$.

Proof. The correctness of Algorithm 3.3.8 follows from the fact that $F(X)$ is irreducible if $V(p+1) \notin GF(p)$ (Lemma 3.3.7). The run time estimate follows from Lemma 3.2.3 and the fact that $V(p+1) \notin GF(p)$ if $F(X)$ is irreducible (Lemma 3.3.7).

Remark 3.3.10. Although the method from Section 3.2. is 30% faster than Algorithm 3.3.8, there may be circumstances where the latter is preferable, because it does not require the additional software for the implementation of Algorithm 3.2.8. In the next section we show that a proper B can be found much faster if p mod $9 \neq 8$, namely at the cost of a single application of Algorithm 2.4.4.

3.4 Direct Approach if p mod $9 \neq 8$

In this section we prove that if p mod $9 \neq 8$ (but $p \equiv 2 \bmod 3$) then good candidate polynomials of the form $X^3-B'X^2+B'^pX-1 \in GF(p^2)[X]$ can be written down directly, as follows from a general argument that applies even to the characteristic zero case. We present a simplified description that applies just to non-zero characteristics.

Representing $GF(p^6)$, 3.4.1. So far we have considered primes $p \equiv 2 \bmod 3$, as this implies that the polynomial $(X^3-1)/(X-1)=X^2+X+1 \in GF(p)[X]$ is irreducible over $GF(p)$ and its zeros form an optimal normal basis for $GF(p^2)$ over $GF(p)$. As shown in Section 2.2 this leads to a very efficient and convenient representation of $GF(p^2)$.

In this section we restrict our choice of p to $p \equiv 2 \bmod 9$ or p 5 mod 9, i.e. $p \equiv 2 \bmod 3$ but p mod $9 \neq 8$. For these p the polynomial $(Z^9-1)/(Z^3-1)=Z^6+Z^3+1 \in GF(p)[Z]$ is irreducible over $GF(p)$. Namely, assume that $Z^6+Z^3+1$ is reducible over $GF(p)$. Then it would have a zero, say $\zeta$, in either $GF(p), GF(p^2)$, or $GF(p^3)$, which implies that $\zeta^{p^i-1}=1$ for i either 1, 2 or 3. From $(Z^9-1)/(Z^3-1)=Z^6+Z^3+1$ it follows that $\zeta^9=1$, so that $\zeta^d=1$ where d is the greatest common divisor of $p^i-1$ and 9. Because $p \equiv 2 \bmod 9$ or $p \equiv 5 \bmod 9$ we find that d is either 1 or 3, so that $\zeta^3=1$. With $\zeta^6+\zeta^3+1=0$ this leads to $1+1+1=3 \equiv 0 \bmod p$, which contradicts the choice of p. We conclude that the polynomial $Z^6+Z^3+1$ is irreducible over $GF(p)$.

Now let $\zeta$ denote a zero of the irreducible polynomial $Z^6+Z^3+1$. This $\zeta$ enables us to conveniently represent elements of $GF(p^6)$, either using a basis over $GF(p)$ or using a basis over $GF(p^2)$. For the purposes of the present section we use a basis over $GF(p)$ and write elements of $GF(p^6)$ as $a_5\zeta^5+a_4\zeta^4, +a_3\zeta^3, a_2\zeta^2+a_1\zeta+a_0$ for $a_i$ in $GF(p)$. In this representation elements of the subfield $GF(p^2)$ of $GF(p^6)$ correspond to elements of the form $a_3\zeta^3+a_0$; this follows from $3*p^2 \equiv 3 \bmod 9$ and a counting argument. The element $a_5\zeta^5+a_4\zeta^4+a_3\zeta^3+a_2\zeta^2+a_1\zeta+a_0$ can be rewritten as $(a_5\zeta^6+a_2\zeta^3)\zeta^{-1}+(a_4\zeta^6+a_1 f^3)\zeta^{-2}+(a_3\zeta^6+a_0\zeta^3)\zeta^3$. With $\zeta^3=\alpha$ (cf.

Section 2.1) this implies that $\{\zeta^{-1}, \zeta^{-2}, \zeta^{-3}\}$ forms a basis for $GF(p^6)$ over $GF(p^2)$, using the representation of $GF(p^2)$ as set forth in Section 2.1. Obviously, the latter basis is equivalent to the basis $\{\zeta^2, \zeta, 1\}$ which we found convenient for implementation purposes. Combined with the formulas given in [COHLEN] this basis trivially leads to squaring and multiplication in $GF(p^6)$ at the cost of 12 and 18 multiplications in $GF(p)$, respectively. Note that it is straightforward to move back and forth between these various representations of $GF(p^6)$ at the cost of a small constant number of additions in $GF(p)$.

None of the above bases is optimal normal. For the calculations in this section that is not a problem, since they had to be carried out only once. For practical applications of XTR it is not a disadvantage either, because in the application in Section 4.5 at most three multiplications in $GF(p^6)$ have to be carried out per XTR key recovery. Note that if $p$ mod 7 generates $GF(7)^*$ the polynomial $(X^7-1)/(X-1)$ is irreducible over $GF(p)$ and leads to an optimal normal basis for $GF(p^6)$ over $GF(p)$ (cf. [12]). We chose not to use this representation because it imposes additional restrictions on $p$ without leading to significant advantages.

Lemma 3.4.2. The trace of $a_5\zeta^5+a_4\zeta^4+a_3\zeta^3+a_2\zeta^2+a_1\zeta+a_0 \in GF(p^6)$ over $GF(p^2)$ equals $3(a_3\zeta^3+a_0)=3(a_3\alpha+a_0)=3a_0\alpha^2+3(a_3-a_0)\alpha$.

Proof. Because the trace is a $GF(p^2)$-linear operation, it suffices to show that the trace of $\zeta^i$ is zero for $i=1, 2, 4, 5$, and $3\zeta^i$ for $i=0, 3$. This follows trivially from $\zeta^9=1$, $\zeta^6+\zeta^3+1=0$, and the fact that the trace of $\zeta^i$ equals $\zeta^i+\zeta^{ip^2}+\zeta^{ip^4}$.

Lemma 3.4.3. For $x \in GF(p^6)$ the trace over $GF(p^2)$ of $x^p$ equals the $p^{th}$ power of the trace of $x$ over $GF(p^2)$.

Proof. The trace over $GF(p^2)$ of $x^p$ equals $X^p+x^{p^3}+x^{p^5}$ which is the $p^{th}$ power of the trace $x+x^{p^2}+x^{p^4}$ of $x$ over $GF(p^2)$.

A particularly convenient property of the representation of $GF(p^6)$ in 3.4.1 is that it enables us to do several calculations without using the specific value of the prime number $p$. The following result is an example.

Proposition 3.4.4. Let $a \in GF(p)$, let $\zeta$ and $\alpha=\zeta^3$ be as above, and let $Q=(p^6-1)/(p^2-p+1)$. Then the trace over $GF(p^2)$ of the element $(\zeta+a)^Q$ of $GF(p^6)$ of order dividing $p^2-p+1$ equals $$\frac{-3}{a^6-a^3+1}\left((a^2-1)^3\alpha + a^3(a^3-3a+1)\alpha^2\right) \text{ if } p \equiv 2 \mod 9,$$

and the $p^{th}$ power thereof if $p \equiv 5 \mod 9$, where $a^6-a^3+1\neq 0$.

Proof. If $a^6-a^3+1=0$, then $b=a^3$ is a zero in $GF(p)$ of the sixth cyclotomic polynomial $X^2-X+1$. It follows that $b^6=1$. With $b^{p-1}=1$ and $\gcd(p-1, 6)=2$ we find that $b^2=1$ so that $b=\pm 1$. But neither $+1$ nor $-1$ is a zero of $X^2-X+1$, and we conclude that $a^6-a^3+1\neq 0$.

From $Q=(p^6-1)/(p^2-p+1)=p^4+p^3-p-1$ it follows that $$(\zeta+a)^Q = \frac{(\zeta+a)^{p^4}(\zeta+a)^{p^3}}{(\zeta+a)^p(\zeta+a)} = \frac{(\zeta^{p^4}+a)(\zeta^{p^3}+a)}{(\zeta^p+a)(\zeta+a)}.$$

With $\zeta^9=1$ this reduces to $$\frac{(\zeta^7+a)(\zeta^8+a)}{(\zeta^2+a)(\zeta+a)}$$

if $p \equiv 2 \mod 9$ and to $$\frac{(\zeta^4+a)(\zeta^8+a)}{(\zeta^5+a)(\zeta+a)}$$

if $p \equiv 5 \mod 9$. If $p \equiv 5 \mod 9$ the $p^{th}$ power of the former expression equals the latter, so that if $p \equiv 5 \mod 9$ the trace of $(\zeta+a)^Q$ equals the $p^{th}$ power of the trace of $(\zeta+a)^Q$ when $p \equiv 2 \mod 9$ (cf. Lemma 3.4.3). For the computation of the trace of $(\zeta+a)^Q$ when $p \equiv 2 \mod 9$ one easily verifies that $(a^6-a^3+1)/(\zeta+a)=(a^3-\zeta^3-1)(\zeta^2-a\zeta+a^2)$ and that $(a^6-a^3+1)/(\zeta^2+a)=-a\zeta^5+(a^3-1)\zeta^4+a^2\zeta^3-a^4\zeta^2-\zeta+a^5$. With $\zeta^6+\zeta^3+1=0$ the trace of $$\frac{(\zeta^7+a)(\zeta^8+a)}{(\zeta^2+a)(\zeta+a)}$$

then follows from a straightforward computation and Lemma 3.4.2.

Corollary 3.4.5. If $a\neq 0, \pm 1$, then $$\frac{-3}{a^6-a^3+1}\left((a^2-1)^3\alpha + a^3(a^3-3a+1)\alpha^2\right) \in GF(p^2)$$

is the trace over $GF(p^2)$ of an element of $GF(p^6)^*$ of order dividing $p^2-p+1$ and larger than 3.

Proof. From Proposition 3.4.4 it follows that there is an $x \in GF(p^6)^*$ of order dividing $p^2-p+1$ with the required trace over $GF(p^2)$. If the order if $x$ is at most 3, i.e., 1 or 3, then $x$ is either equal to 1, $\alpha$, or $\alpha^2$, since $p \equiv 2 \mod 3$. Thus, the trace of $x$ is equal to 3, $3\alpha$, or $3\alpha^2$. For the first possibility, $x=1$, a trace value of 3 leads to two simultaneous polynomial equations $(a^2-1)^3-(a^6-a^3+1)=0$ and $a^3(a^3-3a+1)-(a^6-a^3+1)=0$; since these polynomials are relatively prime, $x$ cannot be equal to 1. For the other two possibilities, $x=\alpha$ or $x=\alpha^2$, the corresponding trace values lead to $a=0$ or $a=+1$, respectively, which are excluded by assumption.

We conclude that the trace values $(-27\alpha-24\alpha^2)/19$ and $(27\alpha+3\alpha^2)/19$ (for $a=2$ and $a=\frac{1}{2}$, respectively) are traces of elements of $GF(p^6)^*$ of order dividing $p^2-p+1$ and greater than 3. This leads to the following algorithm to find a proper initial $B$ as in Lemma 2.3.1.

Algorithm 3.4.6, Computation of B
1. Use Algorithm 2.4.4 with $B$ replaced by $B'=(27\alpha+3\alpha^2)/19 \mod p$ to compute $T((p^2-p++1)/q)$;
2. If $T(p^2-p+1)/q)=3$, then use Algorithm 2.4.4 with $B$ replaced by $B'=(-27\alpha-24\alpha^2)/19 \mod p$ to compute $T((p^2-p+1)/q)$;
3. If $T((p^2-p+1)/q)=3$, then return failure;
4. Let $B=T((p^2-p+1)/q)$.

The probability that Algorithm 3.4.6 fails may be expected to be $q^{-2}$, which is negligibly small. If this error probability is a matter of concern, however, Algorithm 3.4.6 can trivially be extended and include more 'hard-wired' choices for the trace value $B'$ (corresponding to $a\neq 0, \pm 1, 2, \frac{1}{2}$).

4. Applications

The subgroup representation method described in Section 2 is referred to as XTR, for efficient and compact subgroup trace representation. XTR can be used in any cryptosystem that relies on the (subgroup) discrete logarithm problem. In this section we describe some of these applications in more detail: Diffie-Hellman key agreement in 4.1, ElGamal encryption in 4.2, and Nyberg-Rueppel message recovery digital signatures in 4.3. For all these applications we assume that primes p and q have been selected as described in 2.1 such that q divides $p^2-p+1$ and that $B \in GF(p^2)$ has been determined as representation of a generator of a subgroup of order q, for instance using the method described in Section 3. We also discuss how the public key data p, q, and B may be represented (in 4.4 and 4.5), and we compare the performance of XTR with RSA and ECC (in 4.6).

XTR may also be used to implement the Cramer-Shoup method in such a way that the public key and encryption sizes are more manageable than in the original description. The details can be found in 4.7.

4.1 Application to the Diffie-Hellman Scheme

Suppose that two parties, Alice and Bob, who both have access to the public key data p, q, B want to agree on a shared secret key. They can do this by performing the following XTR version of the Diffie-Hellman scheme:
1. Alice selects at random an integer a, $1<a<q-2$, uses Algorithm 2.4.4 to compute $V_A=T(a) \in GF(p^2)$, and sends $V_A$ to Bob.
2. Bob receives $V_A$ from Alice, selects at random an integer b, $1<b<q-2$, uses Algorithm 2.4.4 to compute $V_B=T(b) \in GF(p^2)$, and sends $V_B$ to Alice.
3. Alice receives $V_B$ from Bob, and uses Algorithm 2.4.4 with B replaced by $V_B$ to compute $K_{AB}=T(a) \in GF(p^2)$.
4. Bob uses Algorithm 2.4.4 with B replaced by $V_A$ to compute $K_{AB}=T(b) \in GF(p^2)$.

The length of the messages exchanged in this DH variant is about one third of the length of the messages in other implementations of the DH scheme that achieve the same level of security and that are based on the difficulty of computing discrete logarithms in (a subgroup of) the multiplicative group of a finite field. Also, the XTR version of the DH scheme requires considerably less computation than those previously published methods (cf. Remark 2.4.6).

FIG. 8 is a flow diagram of the method of Diffie-Hellman key exchange, as shown in section 4.1, using keys generated by the method of FIG. 7.

4.2 Application to the ElGamal Encryption Scheme

Suppose that Alice is the owner of the public key data p, q, B, and that Alice has selected a secret integer k and computed the corresponding public value C T(k) using Algorithm 2.4.4. Thus, Alice's public key data consists of (p, q, B, C). Given Alice's public key (p, q, B, C) Bob can encrypt a message M intended for Alice using the following XTR version of ElGamal encryption:
1. Bob selects at random an integer b, $1<b<q-2$;
2. Bob uses Algorithm 2.4.4 to compute $V_B=T(b) \in GF(p^2)$.
3. Bob uses Algorithm 2.4.4 with B replaced by C to compute $K=T(b) \in GF(p^2)$.
4. Bob uses K to encrypt M, resulting in the encryption E.
5. Bob sends $(V_B, E)$ to Alice.

Note that Bob may have to hash the bits representing K down to a suitable encryption key length.

Upon receipt of $(V_B, E)$, Alice decrypts the message in the following manner:
1. Alice uses Algorithm 2.4.4 with B replaced by $V_B$ to compute $K=T(k) \in GF(p^2)$.
2. Alice uses K to decrypt E resulting in M.

The message $(V_B, E)$ sent by Bob consists of the actual encryption E, whose length strongly depends on the length of M, and the overhead $V_B$, whose length is independent of the length of M. The length of the overhead in this variant of the ElGamal encryption scheme is about one third of the length of the overhead in other implementations of hybrid ElGamal encryption (cf. Remark 4.2.1). Also, the XTR version of ElGamal encryption and decryption is considerably faster (cf. Remark 2.4.6).

FIG. 9 is a flow diagram of the method of ElGamal encryption, as shown in section 4.2, using keys generated by the method of FIG. 7.

Remark 4.2.1. XTR-ElGamal encryption and decryption as described above is based on the common hybrid version of ElGamal's method, i.e., where the key K is used in conjunction with an (unspecified) symmetric key encryption method. In more traditional ElGamal encryption the message is restricted to the key space and 'encrypted' using, for instance, multiplication by the key, an invertible operation that takes place in the key space. In our description this would amount to requiring that $M \in =GF(p^2)$, and by computing E as $K*M \in GF(p^2)$. Compared to non-hybrid ElGamal encryption XTR saves a factor three on the length of both parts of the encrypted message, for messages that fit in the key space (of one third of the 'traditional' size).

Remark 4.2.2. As in other descriptions of ElGamal encryption it is implicitly assumed that VB represents a power of g (and its conjugates). This can explicitly be tested by checking that $V_B \in GF(p^2) \backslash GF(p)$, that $V_B \neq 3$, and by using Algorithm 2.4.4 with $B=V_B$ to verify that $T(q)=3$. This follows using methods similar to the ones presented in Section 3.

4.3 Application to Digital Signature Schemes

Let, as in 4.2, Alice's public key data consists of (p, q, B, C), where $C=T(k)$ and k is Alice's private key. Furthermore, assume that $C_+=T(k+1)$ or $C_-=T(k-1)$ is included in Alice's public key (cf. 2.5). If $C_+$ is included in Alice's public key, we assume that the methods from Section 4.5 are used to derive $C_-$, and vice versa, so that both $C_+$ and $C_-$ are available to the verifying party Bob. We show how the Nyberg-Rueppel (NR) message recovery signature scheme can be implemented using XTR. Application of XTR to other digital signature schemes goes in a similar way. To sign a message M containing an agreed upon type of redundancy, Alice does the following:
1. Alice selects at random an integer a, $1<a<q-2$.
2. Alice uses Algorithm 2.4.4 to compute $V_A=T(a) \in GF(p^2)$.
3. Alice uses $V_A$ to encrypt M, resulting in the encryption E.
4. Alice computes the (integer valued) hash h of E.
5. Alice computes $s=(k*h+a)$ modulo q in the range $\{0,1, \ldots, q-1\}$.
6. Alice's resulting signature on M is (E,s).

As in 4.2 Alice may have to hash the bits representing VA down to a suitable encryption key length.

To verify Alice's signature (Es) and to recover the signed message M, Bob does the following:
1. Bob obtains Alice public key data (p, q, B, C, $C_+$, $C_-$).
2. Bob checks that $0 \leq s<q$; if not failure.
3. Bob computes the hash h of E (using the same hash function used by Alice).
4. Bob replaces h by $-h$ modulo q (i.e., in the range $\{0,1, \ldots, q-1\}$).
5. Bob uses Algorithm 2.5.3 to compute the representation $V_B$ of $g^s*y^h$ given a=s, b=h, B, C, $C_+$, and $C_-$.
6. Bob uses VB to decrypt E resulting in the message M.
7. If M contains the agreed upon type of redundancy, then the signature is accepted; if not the signature is rejected.

Both for signature generation and signature verification XTR is considerably faster than other subgroup based implementations of the NR scheme (cf. Remarks 2.4.6 and 2.5.5). The length of the signature is identical to other variants of the hybrid version of the NR scheme (cf. Remark 4.2.1): an overhead part of length depending on the desired security (i.e, the subgroup size) and a message part of length depending on the message itself and the agreed upon redundancy. Similar statements hold for other digital signature schemes, such as DSA.

FIG. 10B is a flow diagram of the method of generating digital signatures, as shown in section 4.3, using keys generated by the method of FIG. 7.

4.4 Public Key Size

For the applications in 4.1 and 4.2 a public key consisting of (p, q, B, C) suffices. For the digital signature application in 4.3 a much larger public key consisting of (p, q, B, C, $C_+$, $C_-$) is required. We assume that public keys are certified in some way, and that the certificates contain information identifying the owner of the key. Furthermore, we assume that the bit-lengths P of p and Q of q are fixed system parameters, known to all parties in the system, and that P>Q−2 (cf. 2.1). We discuss how much overhead is required for the representation of the public key in a certificate, i.e., on top of the user ID and other certification related bits.

If no attempts are made to compress the key, then representing (p,q,B,C) takes 5*P+Q bits, and (p, q, B, C, $C_+$, $C_-$) requires 9*P+Q bits. We sketch one possible way how, at the cost of a small computational overhead for the recipient of the public key, p, q, and B can be represented using far fewer than 3*P+Q bits.

First of all, the prime q can be determined as a function $f$ of the user ID and a small seed s, for some function $f$ that is known to all parties in the system. The seed could consist of a random part $s_1$ and a small additive part $s_2$ that is computed by the party that determines q, for instance by finding a small integer $s_2$(of about $\log_2(O)$ bits) such that $12*(f(ID,s_1)+s_2)+7$ is prime (and defines q, cf. 2.1). Given q, the smallest (or largest) root r in $\{0, 1, \ldots, q-1\}$ of $x^2-x+1$ modulo q can be found using a single exponentiation in GF(q). From P an integer $z_1$ easily follows such that p should be at least $r+z_1*q$, and a small integer $z_2$ (of about $\log_2(p)$ bits) can be found such that $r+z_1*q+z_2*q$ is prime (and defines p, cf. 2.1). Thus, assuming that $f$, P, and Q are system-wide parameters, the primes q and p can be determined given the user ID, s, and $Z_2$ at the cost of essentially a single exponentiation in GF(q). Alternatively the party determining q may pick random $s_1$'s until r (or $r+z_1*q$) itself is prime (and defines p). In that case q and p are fully determined by and can quickly be recovered from the user ID and s.

To compress the number of bits required for the representation of B we assume that the party that determines B uses Algorithm 3.2.1 or Algorithm 3.3.8, but instead of selecting B' at random, tries $B'=i\alpha+(i+1)\alpha^2$ (cf. 2.1) for i=2, 3, 4, . . . , in succession, until B is found. The final B' can usually be represented using at most 5 bits (if not, just pick another $s_1$ and start all over again). Alternatively, one may use p mod 9≠8 and determine B' using Algorithm 3.4.6; in that case no additional bits are required for the representation of B'. In any case, the corresponding B can be determined given B' at the cost of a single application of Algorithm 2.4.4 with B replaced by B'.

All these computations to recover p, q, and B can easily be performed by the recipient of a certificate. Correctness of the bits provided (i.e., if they lead to primes q and p of the right sizes, and to a B representing an order q element) should be verified by the certification authority. We conclude that p, q, and B can be selected in such a way that they can be recovered from the user ID and an additional $\log_2(s_1)+\log_2(Q)+\log_2(p)+5$ bits. It follows from the Prime Number Theorem that 48 additional bits, i.e., 6 bytes, is more than enough, even if one uses the case $Z_2=0$.

We conclude that for the XTR versions of the DH scheme and ElGamal encryption the public key data overhead in the certificates can be limited to 48+2*P bits: 48 bits from which p, q, and B can be derived, and 2*P bits for C. For 170-bit subgroups and 1024-bit finite fields that is about one third of the size of traditional subgroup public keys. It is somewhat more than twice the size of an ECC public key, assuming the finite field, elliptic curve data, and group size are shared among all parties in the ECC system. If curves or finite fields are not shared, then ECC public keys need substantially more bits than XTR when applied as in 4.1 or 4.2 unless similar ID based methods are used for curve and finite field generation (cf. 4.5).

The public key overhead of XTR when used in conjunction with digital signatures, as in 4.3, is much larger, namely 48+6*P bits. This is still competitive with traditional subgroup public key sizes, but more than non-shared ECC public key sizes. In the next subsection we show how these additional 4*P bits can be saved at the cost of a moderate one time computation for the recipient of the public key.

4.5 Reducing the Public Key Size for Digital Signature Applications

For digital signature applications of XTR the public key contains C, $C_+$, and $C_-$. We show that, at the cost of a moderate one time computation, it suffices to send just C if p mod 9≠8, thereby reducing the public key overhead for digital signature applications of XTR from 48+6*P to 48+2*P bits. An easy way to see that C and $C_+$ in general (i.e., without the restriction that p mod 9≠8) suffice is as follows. Assume that C and $C_+$ are given. From Lemma 2.5.2 with T(0)=3, T(1)=B, T(n)=C and T(n+1)=$C_+$ and the fact that the determinant of the matrix A equals 1 it follows that T(n−1)=$C_-$ has to be determined such that the determinant of the matrix from Lemma 2.5.2 with T(n) on the diagonal equals the determinant of the matrix from Lemma 2.5.2 with T(0) on the diagonal. This leads to a third degree equation in T(n−1) (i.e., $C_-$) over GF($p^2$), which can be solved at the cost of a small number of pth powerings in GF($p^2$). The correct candidate can be determined at the cost of at most a few additional bits in the public key. We present a conceptually more complicated method that can be used not only to determine $C_-$ given C and $C_+$, but that can also be used to establish the correctness of $C_+$ (i.e., that $C_+$ is the proper value corresponding to B and C). After that we show how $C_+$ can be determined given just C (and B, of course) if p mod 9≠8. Let $C=y+y^{p-1}+y^{-p}$, as in 2.5.

Definition 4.5.1. Let $F_r \in GF(p^2)[X]$ denote the minimal polynomial over GF($p^2$) of r∈GF($p^6$).

Definition 4.5.2. Let r, s∈GF($p^6$). The root-product $\mathfrak{R}(r,s)$ of r and s is defined as the polynomial with roots $\{\alpha*\beta | \alpha, \beta \in GF(p^6), F_r(\alpha)=0, F_s(\beta)=0\}$.

Lemma 4.5.3. Let r, s∈GF($p^6$).

Then $\mathfrak{R}(r, s) = F_{rs} * F_{rs^{p^2}} * F_{rs^{p^4}} \in GF(p^2)[X]$.

Proof. According to Definition 4.5.2 the roots of the root-product $\mathfrak{R}(r,s)$ are $r^{p^i} s^{p^j}$ for i, j∈{0,2,4}, i.e., rs and its conjugates over $GF(p^2)$ (for i≡j), $rs^{p^2}$ and its conjugates (for j≡i+2 mod 6), and $rs^{p^4}$ and its conjugates (for j≡i+4 mod 6). The proof follows.

Lemma 4.5.4. Given B, T(m−2), T(m−1), and T(m), values K, L, M∈$GF(p^2)$ such that $g^m \equiv Kg^2+Lg+M$ modulo $g^3-Bg^2+B^p g-1$ can be computed at the cost of a small constant number of operations in $GF(p^2)$.

Proof. By raising $g^m \equiv Kg^2+Lg+M$ to the $(p^i)^{th}$ power for i=0, 2, 4, and by adding the three resulting identities, we find that T(m) KT(2)+LT(1)+MT(0). Similarly, from $g^{m-1} \equiv Kg+L+Mg^{-1}$ and $g^{m-2} \equiv K+Lg^{-1}+Mg^{-2}$ it follows that T(m−1)=KT(1)+LT(0)+MT(−1) and T(m−2)=KT(0)+LT(−1)+MT(−2), respectively. This leads to the following system of equations over $GF(p^2)$:

$$\begin{pmatrix} T(m-2) \\ T(m-1) \\ T(m) \end{pmatrix} = \begin{pmatrix} T(0) & T(-1) & T(-2) \\ T(1) & T(0) & T(-1) \\ T(2) & T(1) & T(0) \end{pmatrix} \begin{pmatrix} K \\ L \\ M \end{pmatrix}.$$

Because T(m−2), T(m−1), and T(m) are given and the matrix on the right hand side is invertible (cf. proof of Lemma 2.5.2) the proof follows.

If $GF(p^6)$ is represented as $GF(p^2)[X]/F_g(X)=GF(p^2)(g)$, i.e., by adjoining g with $g^3-Bg^2+B^p g-1=0$ to $GF(p^2)$, then Lemma 4.5.4 allows us to compute a representation of $g^m \in GF(p^6)$ for any m. The special case m=p is slightly simpler.

Corollary 4.5.5. Given B and T(p−2), a representation of $g^p \in GF(p^2)(g)$ can be computed at the cost of a small constant number of operations in $GF(p^2)$.

Proof. This follows from Lemma 4.5.4 and the fact that $T(p-1)=T(p^2)=T(1)=B$ and that $T(p)=T(1)^p=B^p$, Lemma 4.5.6. Given B, C, and T(p−2), the root-product $\Re(g, y)$ can be computed at the cost of a small constant number of operations in $GF(p^2)$.

Proof. Since $C=y+y^{p-1}+y^{-p}$ we have that $F_y(X)=X^3-CX^2+C^p X-1 \in GF(p^2)[X]$. For any $z \in GF(p^6)$ the roots of the polynomial $z^3 * F_y(X/z) \in GF(p^6)[X]$ are $zy, zy^{p-1}, zy^{-p}$. Thus, $\Re(g, y) \in GF(p^2)[X]$ can be written as the following product in $GF(p^6)[X]$:

$(g^3 * F_y(X*g^{-1}))*(g^{3(p-1)}*F_y(X*g^{-p+1}))*(g^{-3p}*F_y(X*g^p))=F_y(X*g^{-1})*F_y(X*g^{-p+1})*F_y(X*g^p),$ because the product of g and its conjugates equals 1. To compute $\Re(g, y)$ we represent $GF(p^6)$ as $GF(p^2)(g)$. In this representation, $F_y(X*g^{-1})$ can easily be computed. The remaining two factors $F_y(X*g^{-p+1})$ and $F_y(X*g^p)$ can be computed given a representation of $g^p$ in $GF(p^2)(g)$. With Corollary 4.5.5 the proof now follows.

Lemma 4.5.7. Given B, C, $C_+$, and T(p−2), the correctness of $C_+$ can be checked at the cost of a small constant number of operations in $GF(p^2)$.

Proof. Given B and C, the value for $C_+$ is correct if the roots in $GF(p^6)$ of the polynomial $X^3-C_+X^2+C_+^p X-1 \in GF(p^2)[X]$ are αβ and their conjugates, where α is a root of $X^3-BX^2+B^p X-1$ (i.e., $\alpha=g, g^{p-1}$, or $g^{-p}$) and β is a root of $X^3-CX^2+C^p X-1$ (i.e., $\beta=y, y^{p-1}$, or $y^{-p}$). According to Lemma 4.5.3 the root-product $\Re(g,y) \in GF(p^2)[X]$ is the product of the three minimal polynomials of gy, $gy^{p-1}$, and $gy^{-p}$, respectively, so that $C^+$ is correct if and only if the polynomial $X^3-C_+X^2+C_+^p X-1 \in GF(p^2)[X]$ divides $\Re(g,y)$. The proof now follows from Lemma 4.5.6.

Lemma 4.5.8. If k≠p−1 and k≠−p, then given B, C, $C_+$, and T(p−2), the corresponding $C_-$ can be computed at the cost of a small constant number of operations in $GF(p^2)$.

Proof. Without loss of generality we assume that the roots of $X^3-C_+X^2+C_+^p X-1$ are gy and its conjugates. It follows from Lemma 4.5.3 and k≠p−1, k≠−p that the corresponding $C_-$ satisfies $X^3-C_-X^2+C_-^p X-1=\gcd(\Re(g^{-1},y), \Re(g^{-2},gy))$. The proof now follows from the observation that the root-products $\Re(g^{-1},y)$ and $\Re(g^{-2},gy)$ can be computed as in the proof of Lemma 4.5.6 (with C replaced by $C_+$ for the computation of $\Re(g^{-2},gy)$).

Remark 4.5.9. It is not required to know T(p−2) to compute $C_-$ from B, C, and $C_+$ (or $C_+$ from B, C, and $C_-$), assuming that k is properly chosen, because the following two identities can be proved. If k≠p mod q and k≠1−p mod q, then $C_+$ follows from B, C, and $C_-$ using $(B^p C_- -BC)C_+=C^p(B^2-3B^p)-C_-^p(B^{2p}-3B)-C_-^2B+C^2(B^p-B^2)+CC_-B^{p+1}$, and if k≠p−1 mod q and k≠−p mod, then $C_-$ follows from B, C, and $C_+$ using $(BC_+ -B^p C)C_-=C^p(B^{2p}-3B)-C_+^p(B^2-3B^p)-C_+^2 B^p+C^2(B-B^{2p})+CC_+B^{p+1}$.

Lemma 4.5.10. Given B, the value of T(p−2) can be computed at the cost of a square root computation in GF(p), assuming one bit of information to resolve the square root ambiguity.

Proof. It follows from Corollary 2.4.2.ii, $T(p)=B^p$, and $T(p-1)=T(1)=B$ that T(p−2)=T(p+1). Let $T(p+1)=x_0\alpha+x_1\alpha^2$ with $x_0, x_1 \in GF(p)$. Thus, $-(x_0+x_1)=T(p+1)^p+T(p+1)$ (cf. 2.1). With $T(p+1)=g^{p+1}+g^{p-2}+g^{-2p+1}$, $T(p+1)^p=g^{p-1}+g^{-p+2}+g^{2p-1}$, and $B^{p+1}=B*B^p=(g+g^{p-1}+g^{-p})*(g^p+g^{-1}+g^{-p+1})=g^{p+1}+g^{p-2}+g^{-2p+1}+g^{p-1}+g^{-p+2}+g^{2p-1}+3=T(p+1)^p+T(p+1)+3$ it follows that $x_0+x_1=3-B^{p+1} \in GF(p)$. Similarly, it follows from straightforward evaluation that $(T(p+1)^p-T(p+1))^2=-3*(x_0-x_1)^2$. With the identity for $(T(p+1)^p-T(p+1))^2$ given in the proof of Lemma 2.5.2 we find that $-3(x_0-x_1)^2=B^{2p+2}+18B^{p+1}-4(B^{3p}+B^3)-27 \in GF(p)$. With $x_0+x_1=3-B^{p+1}$ it follows that T(p−2) and its conjugate can be computed at the cost of a square root computation in GF(p). To distinguish $T(p-2)=t^0\alpha+t_1\alpha^2$ from its conjugate $t_1\alpha+t_0\alpha^2$ a single bit that is on if and only if $t_0>t_1$ suffices.

Remark 4.5.9 (and Lemma 4.5.8) implies that $C_-$ does not have to be included in the public key for digital signature applications. Furthermore, Lemma 4.5.7 can be used to check the correctness of $C_+$, if T(p−2) is known. The additional bit required for the fast computation of T(p−2) using Lemma 4.5 can be implicitly assumed if B is always chosen such that $t_0$ and $t_1$ as in Lemma 4.5.10 satisfy $t_0>t_1$. The expected cost of the computation of T(p−2) using Lemma 4.5.10 is $1.3*\log_2(p)$ multiplications in GF(p) if we make the additional assumption that p≡3 mod 4. Without Lemma 4.5.10 the computation of T(p−2) takes an expected $8*\log_2(p)$ multiplications in GF(p), according to Remark 2.4.6.

Note that also $C_+$ does in principle not have to be included in the public key, because the recipient can determine $C_+$ by factoring the $9^{th}$ degree polynomial $\Re(g,y) \in GF(p^2)[X]$ into three $3^{rd}$ degree irreducible polynomials in $GF(p^2)[X]$. Thus, two bits in the public key would suffice to indicate which of the factors of $\Re(g,y)$ is supposed to be used to determine $C_+$. If p mod 9≠8 the results from sections 3.2 and 3.4 can be combined to formulate a much faster method to recover $C_+$ based on B and C. Roughly speaking, the method works by computing explicit representations of g and y in $GF(p^6)=GF$ (p)[X]/($X^6+X^3+1$) based on their representations B and C, respectively, so that the value of $C_+$ follows as the trace over GF($p^2$) of $g*y\in GF(p^6)$.

More precisely, let $y=g^k$ for a secret integer k. The owner of the private key k computes the representation C=T(k) of y using Algorithm 2.4.4 with n=k. Note that the same C is obtained for $n=k*p^2$ mod q and for $n=k*p^4$ mod q since $g^k$, $g^{kp^2}$, and $g^{kp^4}$ are conjugates over GF($p^2$) and thus have the same trace over GF($p^2$), namely C. As a side result of the computation of C, the owner of the private key obtains $C_+=T(k+1)$. However, the value for $C_+$ thus obtained is in general not the same as the value that would be obtained for $n=k*p^2$ mod q or for $n=k*p^4$ mod q, because T(k+1), T(($k*p^2$ mod q)+1), and T(($k*p^4$ mod q)+1) are not the same unless $k\equiv 0$ mod q, despite the fact that T(k), T($k*p^2$ mod q), and T($k*p^4$ mod q) are the same. This is because $g^{k+1}$, $g^{kp^2+1}$, and $g^{kp^4+1}$ are not conjugates over GF($p^2$) unless $k\equiv 0$ mod q, despite the fact that $g^k$, $g^{kp^2}$, and $g^{kp^4}$ are conjugates over GF($p^2$). It follows that for any pair (B, C) there are three possible different values for $C_+$: one that corresponds to the proper secret value k, and two that correspond to the 'wrong' values $k*p^2$ mod q and $k*p^4$ mod q.

Any method to recover $C_+$ from (B, C) will have to resolve this ambiguity. To do this without using additional bits in the public key we do the following. The owner of the private key computes not only T(k+1), but T(($k*p^2$ mod q)+1) and T(($k*p^4$ mod q)+1) as well. Next he selects the secret key as k, $k*p^2$ mod q, or $k*p^4$ mod q depending on which of the three values T(k+1), T(($k*p^2$ mod q)+1), T(($k*p^4$ mod q)+1) is the lexicographically smallest (or largest). It follows that $C_+$ is the lexicographically smallest possibility given the pair (B, C). How this enables the recipient of the pair (B, C) to compute the proper $C_+$ without knowing k is described below in Algorithm 4.5.12. We now first describe how the owner of the private key computes T(k+1), T(($k*p^2$ mod q)+1), and T(($k*p^4$ mod q)+1).

A conceptually straightforward method would be for the owner of the private key to apply Algorithm 2.4.4 three times: once with n=k, once with $n=k*p^2$ mod q, and once with $n=k*p^4$ mod q, and to pick the secret key for which T(n+1) is 'smallest'. A more complicated method that needs just two applications of Algorithm 2.4.4 is as follows. Suppose that S(k) and S(p) are known, at the cost of two applications of Algorithm 2.4.4. To compute T($k*p^2+1$) we observe that T($k*p^2+1$)=T($k*p^2-p^3$)=T(($k-p)*p^2$)=T(k−p). We then use Lemmas 2.5.1 and 2.5.2 and find that $$\begin{pmatrix} T(k-p+1) \\ T(k-p) \\ T(k-p-1) \end{pmatrix} = \begin{pmatrix} T(k) & T(k+1) & T(k+2) \\ T(k-1) & T(k) & T(k+1) \\ T(k-2) & T(k-1) & T(k) \end{pmatrix} \begin{pmatrix} T(0) & T(1) & T(2) \\ T(-1) & T(0) & T(1) \\ T(-2) & T(-1) & T(0) \end{pmatrix}^{-1} \begin{pmatrix} T(-p+1) \\ T(-p) \\ T(-p-1) \end{pmatrix},$$

so that T($k*p^2+1$) follows from S(k) and S(p) using a small constant number of multiplications in GF(p). Similarly, T($k*p^2-1$)=T($k*p^2+p^3$)=T(($k+p)*p2$)=T(k+p), so that a similar matrix identity can be used to compute T($k*p^2-1$) and thereby S($k*p^2$)=(T($k*p^2-1$), T(k), T($k*p^2+1$)). Given S($k*p^2$) and S(p), the same method is then used to compute T($k*p^4+1$).

The corresponding method to compute the lexicographically smallest $C_+$ given just B and C but without knowing the secret k relies on 3.2.5, Scipione del Ferro's method. Before giving the details we describe how cube roots in GF($p^6$) of elements of GF($p^2$) can be computed (cf. Step 3 of 3.2.5). The proof of Algorithm 4.5.11 is a simple verification.

Algorithm 4.5.11, Computation of Cube Roots in GF($p^2$) if p mod 9≠8.

Let r∈GF($p^2$). To compute a cube root of r in GF($p^6$) perform the following steps.
1. Use Algorithm 2.2.4 to compute $t=r^{(p^2+2)/9}\in GF(p^2)$ if p≡5 mod 9 or $t=r^{(8p^2-5)/9}\in GF(p^2)$ if p≡2 mod 9.
2. Compute $s=t^3\in GF(p^2)$ and determine j=0, 1, or 2 such that $\alpha^j*s=r$.
3. Return the cube root $\zeta^j*t\in GF(p^6)$ of r (note that the cube root is in GF($p^2$) if j=0).

Algorithm 4.5.12, Computation of $C_+$ Based on B and C if p mod 9≠8

To compute the lexicographically smallest $C_+$ corresponding to B and C, perform the following steps.
1. Use 3.2.5 to compute a root g∈GF($p^6$)=GF(p)[X]/($X^6+X^3+1$) of the polynomial F(X)=$X^3-BX^2+B^pX-1$, using Algorithm 4.5.11 to compute the third root in Step 3 of 3.2.5.
2. Use 3.2.5 to compute the three roots $y_1, y_2, y_3\in GF(p^6)$=GF(p)[X]/($X^6+X^3+1$) of the polynomial $X^3-CX^2+C^pX-1$, using Algorithm 4.5.11 to compute the third root in Step 3 of 3.2.5 and with w=α in Step 4.
3. For i=1, 2, 3 compute the trace $t_i$ over GF($p^2$) of $g*y_i\in GF(p^6)$ (cf. Lemma 3.4.2).
4. Let $C_+$ be the lexicographically smallest of $t_1, t_2$, and $t_3$.

Theorem 4.5.13. Algorithm 4.5.12 can be expected to require $10.6*\log_2(p)$ multiplications in GF(p). Proof. The square root computation in Step 2 of 3.2.5 can be expected to require $1.3*\log_2(p)$ multiplications in GF(p) (cf. Remark 3.2.9). The application of Algorithm 4.5.11 in Step 3 of 3.2.5 requires a call to Algorithm 2.2.4, at an expected cost of $4*\log_2(p)$ multiplications in GF(p) (cf. Lemma 2.2.5). Thus, a single call to Scipione del Ferro's method 3.2.5 can be expected to require $5.3*\log_2(p)$ multiplications in GF(p), from which the proof follows.

Table 1 summarizes what the XTR public key overhead (on top of the user ID) consists of in various scenarios. We assume that p mod 9≠8 so that B follows implicitly from p and q using Algorithm 3.4.6, and that Algorithm 4.5.12 and Remark 4.5.9 are used to recover C+ and C− given B and C. With 'shared' we refer to applications were all users share p, q, and B; for ECC the concept of a shared part of the public key is very common and also for DSA it is not uncommon.

TABLE 1

|  | non-shared | |
| --- | --- | --- |
| shared | ID-based | non ID-based |
| C | 48 bits, C | p, q, C |

4.6 Comparison of RSA, ECC, and XTR

We give a rough comparison of the performance of RSA, ECC, and XTR. We assume that XTR with P=Q=170 (cf. 4.4) offers approximately the same security as 6*P-bit RSA with a 32-bit public exponent and as ECC with a randomly selected curve over a random P-bit prime field and with a Q-bit prime dividing the group order. For XTR we assume that if p mod 9≠8 and that p≡3 mod 4.

4.6.1. Public Key Sizes

For all systems the number of bits of the public keys depends on the way the public keys are generated, because in all cases considerable savings can be obtained by including the user ID in the generation process (cf. 4.4). For RSA the user ID may be included in the modulus (cf. [14]) and the public exponent may be fixed or determined as a function of the used ID. As a consequence, the size of the RSA public key varies between 3*P and 6*P+32 bits, depending on whether ID based compression methods are used or not.

If, in ECC, the curve and finite field information is shared, then the public key information consists of P+1 bits for the public point, assuming its y-coordinate is represented by a single bit, irrespective of the inclusion of user ID information. In a non-shared ECC setup, the finite field, random curve, and group order information take approximately 3.5*P bits, plus a small constant number of bits to represent a point of high order. Using a method similar to the one in 4.4 this can be reduced to an overhead (on top of the user ID) of, say, 48 bits (to generate the curve and finite field as a function of the user ID and 48 random bits) plus P/2 bits (for the group order information). Thus, non-shared ECC public key sizes vary between 49+1.5*P and 1+4.5*P bits.

For XTR, the public key sizes follow from Table 1.

4.6.2. Speed

In Table 2 speed is measured as approximate number of multiplications in a 170-bit field. RSA-encryption (or signature verification) with a 32-bit public exponent and a 6*P-bit field requires approximately 32 squarings and 16 multiplications in the 6*P-bit field, which is assumed to be equivalent to about 0.8*32+16 multiplications, and thus about 36 as many, i.e., about 1500, multiplications in a 170-bit field. The number of operations required for RSA-decryption (or signature generation) using Chinese remaindering is twice approximately 3*P squarings and 1.5*P multiplications in a 3*P-bit field, which amounts to about 11900 multiplications in a 170-bit field.

For the ECC estimates we use the optimized results from [5], both for the two separate scalar multiplications in ECC-ElGamal encryption and ECC-Diffie-Hellman key agreement, and for the single scalar multiplication in ECC-ElGamal decryption and ECC-NR signature generation. The figures for ECC-ElGamal decryption and ECC-Diffie-Hellman key agreement include (0.8+0.5)*170=221 for the expected number of multiplications in GF(p) to recover the y-coordinate from the x-coordinate and the single additional bit. The faster speed for the case where the full y-coordinate is given is between parentheses. It is as yet unclear if the methods from [5] can be used to combine the two scalar multiplications in ECC-NR signature verification. For that reason we use the estimate 2575 based on a rather straightforward but reasonably fast implementation; it is conceivable that this can be improved to, approximately, 2125 using the methods from [5]. The XTR estimates are based on 4.2, Remark 2.4.6, 4.3, and Remark 2.5.5.

The speeds given in Table 2 are not actual run times. In our software test implementation the relative run times for ECC and XTR are as in Table 2, but 1020-bit (CRA-based) RSA exponentiation is about 3.5 times slower than 170-bit XTR exponentiation, so RSA is about 2.5 times better than suggested by the 11900/1360≈8.7 from Table 1. This is because in software a single 510-bit modular multiplication is usually faster than nine 170-bit modular multiplications. Nevertheless, in applications where decryption speed is important but encryption speed is not, XTR compares very favorably to RSA. An example is the SSL protocol where the client, at the beginning of the protocol, randomly selects a so-called pre-master secret and encrypts it with the public key of the server. On receipt the server retrieves the pre-master secret using its private key. The further SSL session is then based on the pre-master key and (fast) symmetric encryption techniques. Currently, standard NT servers can handle about 10 SSL requests simultaneously because of the large computational overhead of the RSA decryption. With XTR substantially more client requests can be handled simultaneously.

TABLE 2[1]

|  | RSA | ECC shared | ECC non-shared | XTR shared | XTR non-shared |
|---|---|---|---|---|---|
| Public key size ID-based[2] | 510 | 171 | 304 | 340 | 388 |
| non ID-based | 1056 |  | 766 |  | 680 |
| Encryption speed | 1500 | 3400 |  | 2720 |  |
| Decryption speed | 11900 | 1921 (1700) |  | 1360 |  |
| Approximate encryption size | max (1024, 128 + m) | 171 + m (340 + m) |  | 340 + m |  |
| Digital signature generation speed | 11900 | 1700 |  | 1360 |  |
| Digital signature verification speed | 1500 | 2575 |  | 2754 |  |
| Approximate digital signature size | max (1024, 128 + m) | 170 + m |  | 170 + m |  |
| Diffie-Hellman speed | n/a | 3842 (3400) |  | 2720 |  |
| Diffie-Hellman message size | n/a | 171 (340) |  | 340 |  |
| Key generation | two independent 510-bit primes | curve with 170-bit prime order subgroup |  | two 170-bit primes |  |

[1]The figures do not include the computation required for one time public key recovery. For XTR recovery of B and $C_+$ can be expected to take $8*\log_2(q) = 1360$ and $10.6*\log_2(p) = 1802$ multiplications in GF(p), respectively (cf. Algorithm 3.4.6 and Theorem 4.5.13).

[2]ID based key generation for RSA affects the way the secret factors are determined. The ID based approach for RSA is therefore viewed with suspicion and not generally used, despite the fact that no attacks on the methods from, for instance, [14] are known. For discrete logarithm based methods (such as ECC and XTR) ID based key generation affects only the part of the public key that is not related to the secret information, i.e., the way the public point is determined isnot affected. The ID based approach is therefore commonly used for discrete logarithm based systems. This distinction between RSA on the one hand, and ECC and XTR on the other hand, should be kept in mind while interpreting the data in this row.

4.6.3. Signature, Encryption, and Diffie-Hellman Message Size

For the encryption and digital signature sizes we assume a message consisting of m bits (including the redundancy) and, in 4.2, 4.3, and similar ECC applications, a symmetric encryption method using a 128-bit key. For RSA we assume that if the message is too long (to be encrypted or signed with message recovery using a single RSA application), then RSA is used in conjunction with the same symmetric encryption method. The ECC sizes between parentheses refer to the encryption or message sizes if the full y-coordinate is given (as opposed to a single bit), to achieve greater speed.

4.6.4. Key Generation

For RSA two independent 3P-bit primes have to be generated. For XTR two P-bit primes have to be found either consecutively (assuming $Z_2$ as in 4.4 is allowed to be non-zero) or simultaneously (assuming $Z_2$ as in 4.4 is 0). In the former case XTR key generation may be expected to be about $3^4=81$ times faster than RSA key generation. In the latter case RSA and XTR key generation is about equally expensive for P=170: on the order of $2*(3P)^4$ bit operations for RSA, and on the order of $P^5$ bit operations for XTR. ECC key generation is orders of magnitude slower and considerably more complicated than either RSA or XTR key generation.

4.7 Application to the Cramer-Shoup Cryptosystem

We describe in detail the application of XTR to the Cramer-Shoup cryptosystem (CSC). We show that XTR-CSC leads to faster processing and substantially shorter public keys and messages, compared to the original description of CSC in [8]. Our presentation is based on the hybrid scheme in [8: Section 5.2]. We use the same variable names as in [8], with the convention that we write xtr(g) for the XTR-representation of a group element that is denoted by g in [8]. We assume that primes p, q, and $B \in GF(p^2)$ have been selected as described above.

XTR-CSC key generation. Let $g_1$ be the element represented, along with its conjugates, by B. So, B xtr($g_1$) and $T(k)=xtr((g_1)^k)$. The other components of the public and private key are generated as follows.

1. Select a random integer t, $1<t<q-2$, and use Algorithm 2.4.4 to compute $S(t)=(T(t-1), T(t), T(t+1))$. Let $g_2$ be the element represented, along with its conjugates, by T(t). So, $T(t-1)=xtr(g_2/g_1)$, $T(t)=xtr(g_2)$, and $T(t+1)$ $xtr(g_2*g_1)$. The representations of $g_2/g_1$ and $g_2*g_1$, respectively, are required for the computation of (a power of) the product of powers of $g_1$ and $g_2$ during the decryption process. The integer t can be disposed of after key generation is finished.
2. Select random integers $x_1, x_2, y_1, y_2, z$ with $1<X_1, x_2, y_1, y_2, z<q-2$.
3. Use Algorithm 2.4.4 to compute $T((y_1+t*y_2) \bmod q)=xtr(d)$.
4. Use Algorithm 2.4.4 with $n=((x_1+t*x_2)/(y_1+t*y_2)) \bmod q$ and B replaced by xtr(d) to compute $S(n)=(T((x_1+t*x_2-(y_1+t*y_2))\bmod q), T((x_1+t*x_2)\bmod q), T((x_1+t*x_2+(y_1+t*y_2))\bmod q)=(xtr(c/d), xtr(c), xtr(c*d))$. The representations xtr(c/d) and xtr(c*d) are required for the computation of the product of powers of d and c during the encryption process.
5. Use Algorithm 2.4.4 to compute $T(z)=xtr(h)$.
6. Select a hash function H from the family of universal one-way hash functions that map bit strings to non-negative integers less than q.

The resulting public key is (p, q, B=xtr($g_1$), (xtr($g_2/g_1$), xtr($g_2$), xtr($g_2*g_1$)), (xtr(c/d), xtr(c), xtr(c*d)), xtr(d), xtr(h), H), and the private key is ($x_1, x_2, y_1, y_2, z$). The methods from Section 4.5 can be used to reconstruct xtr($g_2/g_1$) based on B=xtr($g_1$), xtr($g_2$), and xtr($g_2*g_1$), and to reconstruct xtr(c/d) based on xtr(d), xtr(c), and xtr(c*d), in which case the public key consists of just (p, q, B=xtr($g_1$), (xtr($g_2$), xtr($g_2*g_1$)), (xtr(c), xtr(c*d)), xtr(d), xtr(h), H). Compared to the pubic key in the original description of CSC, this public key contains two additional values, namely xtr($g_2*g_1$) and xtr(c*d), representing $g_1*g_2$ and c*d, respectively. Thus, they do not reveal any additional information that could not be computed by a recipient of the original CSC public key. The correctness of the additional information can be verified using Lemma 4.5.7.

In addition to the field description and the hash function H, the original CSC public key consists of five field elements, whereas XTR-CSC requires seven subgroup elements at one third the size of a field element each. We may assume that B can be derived from the field data and user ID (cf. section 4.4), so that the resulting size of the XTR-CSC public key is approximately 40% of the size of the original CSC public key.

XTR-CSC encryption. Let (p, q, B=xtr($g_1$), (xtr($g_2/g_1$), xtr($g_2$), xtr($g_2*g_1$)), (xtr(c/d), xtr(c), xtr(c*d)), xtr(d), xtr(h), H) be Alice's (expanded) public key, and let, as in [8: Section 5.2], C be a symmetric key cipher with a key length of l bits. To encrypt a message M intended for Alice, Bob does the following.

1. Select at random an integer r, $1<r<q-2$.
2. Use Algorithm 2.4.4 with n=r to compute $T(r)=xtr(u_1)$.
3. Use Algorithm 2.4.4 with n=r and B replaced by xtr($g_2$) to compute xtr($u_2$).
4. Use Algorithm 2.4.4 with n=r and B replaced by xtr($g_2*g_1$) to compute xtr($u_2*u_1$).
5. Use Algorithm 2.4.4 with n=r and B replaced by xtr(h) to compute κ=
6. As in [8: Section 5.2], compute an encryption key K by hashing κ to an l-bit string with a public 2-universal hash function.
7. Compute $e=C_K(M)$.
8. Compute $\alpha=H(xtr(u_1), xtr(u_2), xtr(u_2*u_1), e)$.
9. Use Algorithm 2.5.3 with $a=r*\alpha \bmod q$, b=r, B replaced by xtr(d) and using xtr(c/d), xtr(c), and xtr(c*d) to compute $xtr(v)=xtr(C^r*d^{r\alpha})$. Note that Step 1 of Algorithm 2.5.3 is for free because a/b mod $q=\alpha$.
10. Send the ciphertext (xtr($u_1$), xtr($u_2$), xtr($u_2*u_1$), e, xtr(v)) to Alice.

Compared to the original CSC ciphertext, the XTR-version contains one additional element, namely xtr($u_2*u_1$) representing $u_2*u_1$, the correctness of which can be verified using Lemma 4.5.7. Thus, this additional element does not reveal any additional information that could not be computed by any party that has access to the original CSC ciphertext.

In the original CSC the encryption overhead (on top of the encryption e of M) consists of three field elements, whereas XTR-CSC requires four subgroup elements at one third the size of a field element each. It follows that the XTR-CSC encryption overhead is approximately 45% of the original CSC encryption overhead. The original CSC encryption needs three separate exponentiations and one combined double exponentiation, whereas XTR-CSC encryption requires six exponentiations. It follows from Remarks 2.4.6 and 2.5.5 that the total computational effort for the latter exponentiations is less than 36% of the total effort of the former, assuming the original CSC is implemented using traditional subgroups. If the full multiplicative group is used for the original CSC, then using XTR-CSC instead is even more advantageous.

XTR-CSC decryption. Let $(xtr(u_1), xtr(u_2), xtr(u_2*u_1), e, xtr(v))$ be a ciphertext sent to Alice, the owner of the private key $(x_1, x_2, y_1, y_2, z)$ corresponding to the public key $(p, q, B=xtr(g_1), (xtr(g_2/g_1), xtr(g_2), xtr(g_2*g_1)), (xtr(c/d), xtr(c), xtr(c*d)), xtr(d), xtr(h), H)$, and let C be a symmetric key cipher with a key length of l bits, as in [8: Section 5.2]. To decrypt the ciphertext, Alice does the following.

1. Use Lemma 4.5.10 with B replaced by $xtr(u_1)$ to compute $xtr((u_1)^{p-2})$.
2. Use Lemma 4.5.7 with $xtr(u_1)$, $xtr(u_2)$, $xtr(u_2*u_1)$, and $xtr((u_1)^{p-2})$ to check the correctness of the value $xtr(u_2*u_1)$. If $xtr(u_2*u_1)$ is not correct, output 'reject'.
3. Use Remark 4.5.9 with $xtr(u_1)$, $xtr(u_2)$, $xtr(u_2*u_1)$, and $xtr((u_1)^{p-2})$ to compute $xtr(u_2/u_1)$.
4. Compute $\alpha := H(xtr(u_1), xtr(u_2), xtr(u_2*u_1), e)$.
5. Use Algorithm 2.5.3 with $a=x_1+y_1*\alpha \mod q$, $b=x_2+y_2*\alpha \mod q$, B replaced by $xtr(u_1)$ and using $xtr(u_2/u_1)$, $xtr(u_2)$, and $xtr(u_2*u_1)$, to compute $xtr(u_1^{x_1+y_1\alpha} u_2^{x_2+y_2\alpha})$.
6. Test if $xtr(u_1^{x_1+y_1\alpha} u_2^{x_2+y_2\alpha})$. If this condition does not hold, output 'reject'.
7. Otherwise, use Algorithm 2.4.4 with n=z and B replaced by $xtr(u_1)$ to compute $\kappa=xtr((g_1)^{zr})$.
8. As in [8: Section 5.2], compute the decryption key K by hashing $\kappa$ to an l-bit string with the public 2-universal hash function from Step 7 of the encryption.
9. Output $M=C_K^{-1}(e)$.

The original CSC decryption needs one single exponentiation and one combined double exponentiation, whereas XTR-CSC decryption requires three exponentiations in the subgroup (and a square-root computation in GF(p) for Step 1). It follows from Remarks 2.4.6 and 2.5.5 that the total computational effort for the latter exponentiations is less than one third of the total effort of the former, assuming the original CSC is implemented using traditional subgroups. If the full multiplicative group is used for the original CSC, then using XTR-CSC instead is even more advantageous.

As the description in [8], our description does not incorporate explicit checks that $xtr(u_1), xtr(u_2), xtr(u_2*u_1), xtr(v)$ indeed represent powers of g (and its conjugates), cf. Remark 4.2.2. In practice these checks are indispensable to maintain resistance against adaptive chosen ciphertext attacks.

Summarizing, the XTR version of the Cramer-Shoup cryptosystem requires less than half the communication and computational overhead compared to more traditional implementations.

5. Security

For completeness we sketch the straightforward proofs that traditional subgroup discrete logarithm and DH problems offer the same security as the XTR based versions. Let the notation be as in Section 2.

Lemma 5.1. Given $y\epsilon<g>$, the discrete logarithm of y with respect to g can be found using a single call to an oracle that given a value $v\epsilon GF(p^2)$ produces an integer a such that $T(a)=v$, if such an integer exists.

Proof sketch. Let $y=g^b$ for some unknown integer b. Let a be the integer produced by an oracle call with $v=y+y^{p-1}+y^{-p}\epsilon GF(p^2)$, then a=b, or $a\equiv b*(p-1) \mod (p^2-p+1)$, or $a\equiv -b*p \mod (p^2-p+1)$. Thus, b can be found be trying at most three different possibilities.

Lemma 5.2. Given $v\epsilon GF(p^2)$ an integer a such that $T(a)=v$, if such an integer exists, can be found using a single call to an oracle that solves the discrete logarithm problem in $<g>$.

Proof sketch. Let $v\epsilon GF(p^2)$. Determine the roots $\alpha, \beta, \gamma \epsilon GF(p^6)$ of the polynomial $X^3-vX^2+v^pX-1\epsilon GF(p^2)[X]$. If $\alpha, \beta, \gamma \not\in <g>$ (which can easily be checked), then a with $T(a)=v$ does not exist. Otherwise, assume without loss of generality that $\alpha\epsilon<g>$, and use the oracle to produce an integer a such that $g^a=\alpha$. This a satisfies $T(a)=v$.

Lemma 5.3. Given $g^a$ and $g^b$ for unknown integers a and b, the value $g^{ab}$ can be computed using two calls to an oracle that given T(u) and T(v), for unknown integers u, v, determines T(uv).

Proof sketch. Given $g^a$ compute its conjugates $g^{a(p-1)}$ and $g^{-ap}$ and $T(a)=g^a+g^{a(p-1)}+g^{-ap}$. Similarly, compute T(b) and, using $g^a/g=g^{a-1}$, compute T(a-1). Determine T(ab) and T((a-1)b) using two calls to the oracle. Determine the roots $\alpha, \beta, \gamma \epsilon GF(p^6)$ of the polynomial $X^3-T(ab)X^2+T(ab)^pX-1\epsilon GF(p^2)[X]$. We have that $\{\alpha, \beta, \gamma\}=\{g^{ab}, g^{ab(p-1)}, g^{-abp}\}$, but it is unclear which of $\alpha, \beta, \gamma$ is the value $g^{ab}$ that we are looking for. For that reason we determine the roots $\alpha', \beta', \gamma' \epsilon GF(p^6)$ of the polynomial $X^3-T((a-1)b)X^2+T((a-1)b)^pX-1\epsilon GF(p^2)[X]$. We have that $\{\alpha', \beta', \gamma'\}=\{g^{(a-1)b}, g^{(a-1)b(p-1)}, g^{-(a-1)bp}\}$, so that $g^{ab}$ can be determined as $\{\alpha, \beta, \gamma\} \cap \{\alpha'*g^b, \beta'*g^b, \gamma'*g^b\}$.

Corollary 5.4. Given $g^a$ and $g^b$ for unknown integers a and b, the value $g^{ab}$ can be found with probability $\epsilon/3$ using a single call to an oracle that given T(u) and T(v), for unknown integers u, v, determines T(uv) with probability $\epsilon$.

Corollary 5.5. Given $g^a$ and $g^b$ for unknown integers a and b, the value gab can be computed using a single call to an oracle that given T(u) and T(v), for unknown integers u, v, determines T(uv), and at most two calls to an oracle that asserts the correctness of the resulting value $g^{ab}$.

It follows from Corollary 5.5 that in many practical situations a single call to the T(u), T(v)→T(uv) oracle would suffice to find $g^{ab}$ given $g^a$ and $g^b$. As an example we mention DH key agreement where the resulting key is actually used after it has been established.

Lemma 5.6. Given T(u) and T(v) for unknown integers u, v, the value T(uv) can be found using a single call to an oracle that given $g^a$ and $g^b$, for unknown integers a and b, determines $g^{ab}$.

Proof sketch. Determine the roots $\alpha, \beta, \gamma \epsilon GF(p^6)$ of the polynomial $X^3-T(u)X^2+T(u)^pX-1\epsilon GF(p^2)[X]$ and the roots $\alpha', \beta', \gamma' \epsilon GF(p^6)$ of the polynomial $X^3-T(v)X^2+T(v)^pX-1\epsilon GF(p^2)[X]$. We have that $\alpha=g^{u(p-1)^i}$ and $\alpha'=g^{v(p-1)^j}$ for unknown i,j$\epsilon$\{0, 1, 2\}. From $\alpha$ and $\alpha'$ determine $g^{uv(p-1)^{i+j}}$ using a single call to the oracle. Because the order of g divides $p^2-p+1$ the sum of $g^{uv(p-1)^{i+j}}$ and its conjugates equals T(uv).

5.7. Breaking XTR is as Hard as Computing Discrete Logarithms in $GF(p^6)*$

For any t>0 and sufficiently large prime number p such that $p^t-1$ has a sufficiently large prime factor, computing discrete logarithms in $GF(p^t)*$ is widely assumed to take time proportional to $L[p^t, 1/3, 1.9229]$, where $L[n, v, \alpha]=\exp((\alpha+o(1))*\ln(n)^v*\ln(\ln(v))^{1-v})$ (cf. [1, 6, 7, 11, 17, 18, 19]). Actually, for appropriately chosen t and p, the discrete logarithm problem in GF(pt)* is believed to be at least as hard as the discrete logarithm problem in a prime field of approximately $t*\log_2(p)$ bits (cf. [18]). Such fields are generally considered to be more secure than $t*\log_2(p)$-bit RSA moduli. Thus, it may be assumed that a properly chosen field of the form $GF(p^t)$ offers a higher degree of security than an RSA modulus of $t*\log_2(p)$ bits.

The discrete logarithm problem in $GF(p^6)^*$ is reducible to computing discrete logarithms in order $p-1$, $p+1$, $p^2+p+1$, and $p^2-p+1$ subgroups of $GF(p^6)^*$. The former three are at most as hard as the discrete logarithm problem in $GF(p)^*$, $GF(p^2)^*$, and $GF(p^3)^*$, respectively, since the first three subgroups can effectively be embedded in the smaller fields. These last three discrete logarithm problems are at most as hard as the discrete logarithm problem in prime fields of approximately $\log_2(p)$, $2*\log_2(p)$, and $3*\log_2(p)$ bits respectively, and thus of complexity at most $L[p^3, \frac{1}{3}, 1.9229]$, i.e., substantially less than $L[p^6, \frac{1}{3}, 1.9229]$. Our results presented above imply that the problem of computing discrete logarithms in an order $p^2-p+1$ subgroup of $GF(p^6)^*$ is, for proper p and q, at most as hard as the XTR discrete logarithm problem. Note that the condition that q divides $\phi_6(p)=p^2-p+1$ is of crucial importance, because if q would divide another factor than $\phi_6(p)$ of $p^6-1$, then the order q subgroup can be embedded in a true subfield of $GF(p^6)$, i.e., $GF(p)$, $GF(p^2)$, or $GF(p^3)$, thereby possibly making the discrete logarithm problem substantially easier.

It follows that, if the complexity of finding XTR discrete logarithms is less than $L[p^6, \frac{1}{3}, 1.9229]$, then the same holds for the computation of discrete logarithms in $GF(p^6)^*$, and that the complexity of the latter problem is at most $L[p^3, \frac{1}{3}, 1.9229]$. This contradicts the above mentioned assumption about the complexity of computing discrete logarithms in $GF(p^t)^*$. We conclude that, with respect to known attacks, the security of XTR using primes p and q of about 170 bits each is at least equivalent to that of RSA using a modulus of about $6*\log_2(p)$ bits, i.e., of about 1020 bits.

Finally, we argue that application of the index calculus approach to the representation $T(k)\epsilon GF(p^2)$ of $g^k$ and its conjugates does not work. Although, for random k, the representation $T(k)$ has a much higher probability to be smooth than $g^k$, because $T(k)\epsilon GF(p^2)$ as opposed to $g^k \epsilon GF(p^6)$, smoothness cannot be used in the way it is done in the index calculus method: there one needs that $g^{k+m}=g^k*g^m$, but $T(k+m)=T(k)*T(m)$ does not hold in general (cf. Lemma 2.4.1).

6. Extensions

Methods similar to the ones described in this paper can be used for compact representation of and fast arithmetic with elements of a subgroup of order dividing $p+1$ in $GF(p^2)^*$, as used for instance in the public key system LUC (cf. [21]). For that application the savings obtained are smaller than in our application, and the resulting comparison to RSA and ECC is less favorable. For that reason we do not elaborate.

Instead of representing powers of g (and their conjugates) of order q dividing $\phi_6(p)$ by elements of $GF(p^2)$ as opposed to $GF(p^6)$, we can represent powers of elements of order dividing $\phi_{30}(p)$ by elements of $GF(p^{10})$ as opposed to $GF(p^{30})$ using the same methods as presented in sections 2 to 5. Because $10+1=11$ is prime (just as $2+1=3$ is prime) we can use an optimal normal basis to represent the underlying field $GF(p^{10})$, but the overall construction is more complicated and fewer suitable primes are available while no additional savings are obtained. The same holds for any integer x for which $2*x+1$ is prime: powers of elements of order dividing $\phi_{6*x}(p)$ can be represented in $GF(p^{2*x})$ as opposed to $GF(p^{6*x})$, and the arithmetic with those powers in the field $GF(p^{2*x})$ is efficient. The case $x=1$, as described in detail in this paper, is the most efficient and most flexible of this more general construction. For that reason we do not present the details of the more general construction.

We are not aware of constructions similar to the ones described in this paper that obtain more savings than obtained by our construction. We have reason to believe that such constructions do not exist, but at his point this is merely a conjecture for which reasonable evidence seems to exist (cf. [3]).

7. References

1. L. M. Adleman, J. DeMarrais, A subexponential algorithm for discrete logarithms over all finite fields, Proceedings Crypto '93, LNCS 773 (1994), 147–158.
2. D. V. Bailey, C. Paar, Optimal extension fields for fast arithmetic in public-key algorithms, Proceedings of Crypto '98, LNCS 1462, 472–485, Springer 1998.
3. A. E. Brouwer, R. Pellikaan, E. R. Verheul, Doing more with fewer bits, Proceedings of Asiacrypt '99, LNCS 1716, 321–332, Springer, 1999.
4. H. Cohen, A. K Lenstra, Implementation of a new primality test, Math. Comp. 40 (1987), 103–121.
5. H. Cohen, A. Miyaji, T. Ono, Efficient elliptic curve exponentiation using mixed coordinates, Proceedings of Asiacrypt '98, LNCS 1514, 51–65, Springer, 1998.
6. D. Coppersmith, Fast evaluation of logarithms in fields of characteristic two, IEEE Trans. Inform. Theory 30 (1984), 587–594.
7. D. Coppersmith, personal communication, March 2000.
8. R. Cramer, V. Shoup, A practical public key cryptosystem provably secure against adaptive chosen ciphertext attack, Proceedings of Crypto 1998, LNCS 1462, 13–25, Springer, 1998.
9. T. ElGamal, A Public Key Cryptosystem and a Signature scheme Based on Discrete Logarithms, IEEE Transactions on Information Theory 31(4), 1985, 469–472.
10. P. Gaudry, F. Hess, N. P. Smart, Constructive and destructive facets of Weil descent on elliptic curves, manuscript, January, 2000, submitted to Journal of Cryptology.
11. D. Gordon, Discrete logarithms in GF(p) using the number field sieve, SIAM J. Discrete Math. 6 (1993), 312–323.
12. D. E. Knuth, The art of computer programming, Volume 2, Seminumerical Algorithms, second edition, Addison-Wesley, 1981.
13. A. K. Lenstra, Using cyclotomic polynomials to construct efficient discrete logarithm cryptosystems over finite fields, Proceedings of ACISP '97, LNCS 1270, 127–138, Springer, 1997.
14. A. K. Lenstra, Generating RSA moduli with a predetermined portion, Proceedings of Asiacrypt '98, LNCS 1514, 1–10, Springer, 1998.
15. A. Menezes, Comparing the security of ECC and RSA, manuscript, January, 2000, available as www.cacr.math.uwaterloo.ca/~ajmeneze/misc/cryptogram-article.html.
16. W. K. Nicholson, Introduction to abstract algebra, PWS-Kent Publishing Company, Boston, 1993.
17. O. Schirokauer, Discrete logarithms and local units, Phil. Trans. R. Soc. Lond. A 345, 409–423, 1993.
18. O. Schirokauer, personal communication, March 2000.
19. O. Schirokauer, D. Weber, Th. F. Denny, Discrete logarithms: the effectiveness of the index calculus method, Proceedings ANTS II, LNCS 1122 (1996).
20. C. P. Schnorr, Efficient signature generation by smart cards, Journal of Cryptology, 4, 161–174 (1991).
21. P. Smith, C. Skinner, A public-key cryptosystem and a digital signature system based on the Lucas function analogue to discrete logarithms, Proceedings of Asiacrypt '94, LNCS 917, 357–364, Springer, 1995.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

Appendix A

We prove that $\Delta$ as in Step 2 of Algorithm 3.2.8 is a quadratic residue in GF(p). Let $F(X)=X^3-BX^2+B^pX-1 \in GF(p^2)[X]$ be as in Algorithm 3.2.8 where, for ease of notation, we use B instead of B'. According to 3.2.5 the roots of F(X) in $GF(p^6)$ can be written as $u+v+y$, $u\alpha+v\alpha^2+y$, and $u\alpha^2+v\alpha+y$ with u and v as in 3.2.5 and y some element of $GF(p^2)$. Because these roots are conjugates we have that either $g=u+v+y$, $g^p=u\alpha+v\alpha^2+y$, and $g^{p^4}=u\alpha^2+v\alpha+y$, or $g=u+v+y$, $g^p=u\alpha^2+v\alpha+y$, and $g^{p^4}=u\alpha^2+v\alpha+y$. Without loss of generality we assume the first case. Multiplying the three identities by 1, $\alpha^2$, and $\alpha$, respectively we get $$g=u+v+y, \; \alpha^2 g^{p^2}=u+v\alpha+y\alpha^2, \; \alpha g^{p^4}=u+v\alpha^2+y\alpha$$

Adding these identities and using that $\alpha^2+\alpha+1=0$ we find that $u=U/3$ where $$U=g+\alpha^2 g^{p^2}+\alpha g^{p^4}.$$

According to 3.2.5 we have that $U^3/27=u^3=r_1$ where $r_1=(-G_0+\sqrt{\Delta})/2$ and $G_0=(-27+9B^{p+1}-2B^3)/27$ (cf. Algorithm 3.2.8). Since $(-27+9B^{p+1})/27 \in GF(p)$ in order to prove that $\sqrt{\Delta} \in GF(p)$ it suffices to prove that $U^3-B^3 \in GF(p)$. With $T(3)=B^3-3B^{p+1}+3$ (cf. Corollary 2.4.2.1 and ii) and $B^{p+1} \in GF(p)$ this is equivalent to proving that $U^3-T(3) \in GF(p)$. With $T(3)=g^3+g^{3p^2}+g^{3p^4}$ it follows from a straightforward computation that $$U^3-T(3)=3(T(p+1)^p-2)\alpha+3(T(p+1)-2)\alpha^2,$$

where $T(p+1)=g^{p+1}+g^{(p+1)p^2}+g^{(p+1)p^4}$ and the exponents of g are taken modulo $p^2-p+1$ (Lemma 2.3.5). It follows that $(U^3-T(3))^p=U^3-T(3)$, so that $U^3-T(3) \in GF(p)$.

Appendix B

We prove the identities given in Remark 4.5.9 that make it possible to compute $C_-$ given B and $C_+$ (or $C_+$ given B and $C_-$), assuming $k \neq p-1 \mod q$ and $k \neq -p \mod q$.

Theorem B.1. Let $C=T(k)$, $C_+=T(k+1)$, and $C_-=T(k-1)$.
1. If $k \neq p \mod q$ and $k \neq 1-p \mod q$, then $B^pC_--BC$ is non-zero and $(B^pC_--BC)C_+=C^p(B^2-3B^p)-C_-^p(B^{2p}-3B)-C_-^2B+C^2(B^p-B^2)+CC_-B^{p+1}$;
2. If $k \neq p-1 \mod q$ and $k \neq -p \mod q$, then $BC_+-B^pC$ is non-zero and $(BC_+-B^pC)C_-=C^p(B^{2p}-3B)-C_+^p(B^2-3B^p)-C_+^2B^p+C^2(B-B^{2p})+CC_+B^{p+1}$ Proof. From Corollary 2.4.2.ii it follows that $B^pC_--BC=T(k-2)-T(k+1)$. Thus, $B^pC_--BC$ can only be zero if $T(k-2)=T(k+1)$, which implies that $g^{k-2}$ and $g^{k+1}$ are conjugates. Thus, either $k-2 \equiv k+1 \mod (p^2-p+1)$, or $k-2 \equiv p^2(k+1) \mod (p^2-p+1)$, or $k-2 \equiv p^4(k+1) \mod (p^2-p+1)$. The first equation has no solution, the second one leads to $k \equiv p \mod (p^2-p+1)$, and the third one to $k \equiv 1-p \mod (p^2-p+1)$. Since $k \neq p \mod q$ and $k \neq 1-p \mod q$ (and q divides $p^2-p+1$) we find that $B^pC_--BC$ is non-zero.

The polynomial $X^3-BX^2+B^pX-1$ is the characteristic polynomial of the matrix A (cf. Lemma 2.5.1), i.e., the roots g, $g^{p-1}$, and $g^{-p}$ of $X^3-BX^2+B^pX-1$ are the eigenvalues of A. Thus, $g^k$, $g^{k(p-1)}$, $g^{-kp}$ are the eigenvalues of the matrix $A^k$, so that the polynomial $X^3-CX^2+C^pX-1$ with roots $g^k$, $g^{k(p-1)}$, $g^{-kp}$ is the characteristic polynomial of $A^k$. From Lemma 2.5.2 we have that $$A^k = \begin{pmatrix} C & C_+ & T(k+2) \\ C_- & C & C_+ \\ T(k-2) & C_- & C \end{pmatrix} \begin{pmatrix} 3 & B & T(2) \\ B^p & 3 & B \\ T(2)^p & B^p & 3 \end{pmatrix}^{-1}.$$

Computing the characteristic polynomial of Ak using this expression, combined with the fact that $T(k-2)=C_+-BC+B^pC_-$, $T(k+2)=BC_+-B^pC+C_-$, and $T(2)=B^2-2B^p$ (cf. Corollary 2.4.2.ii and i), one obtains a polynomial $\lambda^3-C\lambda^2+f_1\lambda+f_0$ with $-D*f_1=(B^{2p}-3B)C_+^2+(3B^pC-9C_++2B^2C+B^{p+1}C_--B^{2p+1}C)C_+-3B^pC_-^2+9C^2+B^{3p}C^2+B^3C^2+B^2C_-^2+3BCC_--B^{p+2}CC_-+2B^{2p}CC_--7B^{p+1}C^2.$ Here $D=B^{2p+2}18B^{p+1}-4(B^{3p}+B^3)-27 \in GF(p)$ as in the proof of Lemma 2.5.2. Since also $f_1=C^p$ we find that $C_+^2=(B^{2p}-3B)^{-1}((-3B^pC+9C_+-2B^2C-B^{p-1}C_++B^{2p+1}C)C_+-DC^p+3B^pC_-^2-9C^2-B^{3p}C^2-B^3C^2-B^2C_-^2-3BCC_++B^{p+2}CC_--2B^{2p}CC_-+7B^{p+1}C^2).$ Note that $B^{2p}-3B=B^pT(-1)-BT(0)$, which is non-zero based on the same argument why $B^pC_--BC$ is non-zero.

Repeating the same argument for the matrix $A^{k-1}$ and its characteristic polynomial $X^3-C_-X^2+C_-^pX-1$ (and using Corollary 2.4.2.ii to express T(k-3) in terms of B, C, $C_+$, and $C_-$) we obtain another expression for $C_+^2$:

$C_+^2=(B^2-3B^p)^{-1}((2B^3C-3BC_--B^{p+2}C_++9C+4B^{2p}C_--7B^{p+1}C)C_+-DC_-^p-B^{2p}C^2-B^4C^2+4B^{p+1}C_-^2+6B^pCC_--6BC^2+4B^{p+2}C^2-B^3C_-^2+B^2CC_--4B^{2p+1}CC_--9C_-^2+B^{p+3}CC_-).$

Here $B^2-3B^p$ is non-zero because its conjugate $B^{2p}-3B$ over GF(p) is non-zero. Subtraction of the two expressions for $C_+^2$ followed by multiplication by $B^{2p}-3B$ and $B^2-3B^p$ and division by D, leads to the expression for $C_+$ in the first part of the theorem.

For a proof of the second part of the theorem, we apply the first part replacing C, $C_+$, and $C_-$ by $D=T(-n)$, $D_+=T(-n+1)$, and $D_-=T(-n-1)$, respectively. The proof then follows by observing that $C_-^p=T(-n+1)=D_+$, $C^p=T(-n)=D$, and $C_+^p=T(-n-1)=D_-$ (cf. Lemma 2.3.4) and by taking the conjugate over GF(p).

What is claimed is:

1. A method of determining a public key having an optionally reduced length and a number p for a cryptosystem resident in a device that includes a memory, using a GF(p) or GF($p^2$) arithmetic to achieve GF($p^6$) security, without explicitly constructing GF($p^6$), comprising the steps of:
  selecting a number q and the number p such that $p^2-p+1$ is an integer multiple of the number q;
  selecting a number g of order q, where g and its conjugates can be represented by B, where $F_g(X)=X^3-BX^2+B^pX-1$ and the roots are g, $g^{p-1}$, $g^{-p}$;
  representing the powers of the conjugates of g using their trace over the field GF($p^2$): and
  providing p, q, and B for computation of the public key as a function of p, q, and B.

2. A method of generating a private key, and computing a public key as a function of p, q, and B generated by a method of determining a public key having an optionally reduced length and a number p for a cryptosystem resident in a device that includes a memory, using GF(p) or GF($p^2$) arithmetic to achieve GF($p^6$) security, without explicitly constructing GF($p^6$), comprising:
selecting the number q and the number p such that $p^2-p+1$ is an Integer multiple of the number q;
selecting a number g of order q, where g and its conjugates can be represented by B, where $F_g(X)=X^3-BX^2+B^pX-1$ and the roots are g, $g^{p-1}$, $g^{-p}$;
representing the powers of the conjugates of g using their trace over the field GF($p^2$);
selecting a private key; and
computing a public key as a function of g and the private key.

3. A method of encrypting a message using the public key generated by the method of claim 2.

4. A method of decrypting a message using the public and private key generated by the method of claim 2.

5. A method of signing a message using the public and private key generated by the method of claim 2.

6. A method of verifying a signature using the public key generated by the method of claim 2.

7. A method of Diffie-Hellman key exchange and related schemes using the p, q, and B as generated by the method of claim 1.

8. A method of key exchange using the public and private key generated by the method of claim 2.

9. A system for determining a public key having an optionally reduced length and a number p, using GF(p) or GF($p^2$) arithmetic to achieve GF($p^6$) security, without explicitly constructing GF($p^6$), comprising:
a processor for selecting a number q and the number p such that $p^2-p+1$ is an integer multiple of the number q;
said processor selecting a number g of order q, where g and its conjugates can be represented by B, where $F_g(X)=X^3-BX^2+B^pX-1$ and the roots are g, $g^{p-1}$, $g^{-p}$;
a memory for storing the number g;
said processor representing the powers of the conjugates of g using their trace over the field GF($p^2$); and
said processor providing for the computation of the public key as a function of p, q, and B.

10. A system for generating a private key, and computing a public key as a function of p, q, and B generated by the method of determining a public key having an optionally reduced length and a number p, using GF(p) or GF($p^2$) arithmetic to achieve GF($p^6$) security, without explicitly constructing GF($p^6$), comprising:
a processor for selecting a number q and a number p such that $p^2-p+1$ is an integer multiple of the number q;
said processor selecting a number g of order q, where g and its conjugates can be represented by B, where $F_g(X)=X^3-BX^2B^pX-1$ and the roots are g, $g^{p-1}$, $g^{-p}$;
said processor representing the powers of the conjugates of g using their trace over the field GF($p^2$);
said processor selecting a private key;
a memory coupled to said processor for storing the private key;
said processor computing a public key as a function of g and the private key; and
a network interface for distributing said public key over a network.

11. A system for encrypting a message using the public key generated by the system of claim 10.

12. A system for decrypting a message using the public and private key generated by the system of claim 10.

13. A system for signing a message using the public and private key generated by the system of claim 10.

14. A system for verifying a signature using the public key generated by the system of claim 10.

15. A system for Diffie-Hellman key exchange and related schemes using the p, q, and B as generated by the system of claim 9.

16. A system for key exchange using the public and private key generated by the system of claim 10.

17. A computer program article of manufacture, comprising:
a computer readable medium for determining a public key having an optionally reduced length and a number p, using GF(p) or GF($p^2$) arithmetic to achieve GF($p^6$) security, without explicitly constructing GF($p^6$), comprising;
a computer program means in said computer readable medium, for selecting a number q and a number p such that $p^2-p+1$ is an integer multiple of the number q;
a computer program means in said computer readable medium, for selecting a number g of order q, where g and its conjugates can be represented by B, where $F_g(X)=X^3-BX^2+B^pX-1$ and the roots are g, $g^{p-1}$, $g^{-p}$; and
a computer program means in said computer readable medium, for representing the powers of the conjugates of g using their trace over the field GF($p^2$).

18. A computer program article of manufacture, comprising:
a computer readable medium for generating a private key, and computing a public key as a function of p, q, and B generated by the method of determining a public key having an optionally reduced length and a number p, using GF(p) or GF($p^2$) arithmetic to achieve GF($p^6$) security, without explicitly constructing GF($p^6$), comprising:
a computer program means in said computer readable medium, for selecting a number q and a number p such that $p^2-p+1$ is and integer multiple of the number q;
a computer program means in said computer readable medium, for selecting a number g of order q, where g and its conjugates can be represented by B, where $F_g(X)=X^3-BX^2+B^pX-1$ and the roots are g, $g^{p-1}$, $g^{-p}$;
a computer program means in said computer readable medium, for representing the powers of the conjugates of g using their trace over the field GF($p^2$);
a computer program means in said computer readable medium, for selecting a private key;
a computer program means in said computer readable medium, for computing a public key as a function of g and the private key; and
a computer program means in said computer readable medium, for distributing said public key over a network.

19. The article of manufacture of claim 18, which further comprises:
a computer program means in said computer readable medium, for encrypting a message using the public key.

20. The article of manufacture of claim 18, which further comprises:
a computer program means in said computer readable medium, for decrypting a message using the public and private key.

21. The article of manufacture of claim 18, which further comprises:
a computer program means in said computer readable medium, for signing a message using the public and private key.

22. The article of manufacture of claim 18, which further comprises:
a computer program means in said computer readable medium, for verifying a signature using the public key.

23. The article of manufacture of claim 17, which further comprises:
a computer program means in said computer readable medium, for performing Diffie-Hellman key exchange and related schemes using p, q, and B.

24. The article of manufacture of claim 18, which further comprises:
a computer program means in said computer readable medium, for key exchange using the public and private key.

25. A business method of determining a public key having an optionally reduced length and a number p for a cryptosystem resident in a device that includes a memory, using GF(p) or $GF(p^2)$ arithmetic to achieve $GF(p^6)$ security, without explicitly constructing $GF(p^6)$, comprising the steps of:
selecting a number q and the number p such that $p^2-p+1$ is an integer multiple of the number q;
selecting a number g of order q, where g and its conjugates can be represented by B, where $F_g(X)=X^3-BX^2+B^pX-1$ and the roots are g, $g^{p-1}$, $g^{-p}$;
representing the powers of the conjugates of g using their trace over the field $GF(p^2)$; and
providing p, q, and B for computation of the public key as a function of p, q, and B.

26. A business method of generating a private key, and computing a public key as a function of p, q, and B generated by a method of determining a public key having an optionally reduced length and a number p for a cryptosystem resident in a device that includes a memory, using GF(p) or $GF(p^2)$ arithmetic to achieve $GF(p^6)$ security, without explicitly constructing $GF(p^6)$, comprising:
selecting the number q and the number p such that $p^2-p+1$ is an integer multiple of the number q;
selecting a number g of order q, where g and its conjugates can be represented by B, where $F_g(X)=X^3-BX^2+B^pX-1$ and the roots are g, $g^{p-1}$, $g^{-p}$;
representing the powers of the conjugates of g using their trace over the field $GF(p^2)$;
selecting a private key; and
computing a public key as a function of g and the private key.

27. A method of encrypting a message using the public key generated by the business method of claim 26.

28. A method of decrypting a message using the public and private key generated by the business method of claim 26.

29. A method of signing a message using the public and private key generated by the business method claim 26.

30. A method of verifying a signature using the public key generated by the business method of claim 26.

31. A method of Diffie-Hellman key exchange and related schemes using the p, q, and B as generated by the business method of claim 25.

32. A method of key exchange using the public and private key generated by the business method of claim 26.

* * * * *